US011528387B2

(12) United States Patent
Inoue

(10) Patent No.: US 11,528,387 B2
(45) Date of Patent: Dec. 13, 2022

(54) INFORMATION PROCESSING APPARATUS, METHOD AND NON-TRANSITORY RECORDING MEDIUM STORING PROGRAM CODES FOR REPLACING COLOR OF CHARACTER PIXEL BASED ON SELECTION OF FIRST AND SECOND PROCESSING METHODS

(71) Applicant: Mika Inoue, Kanagawa (JP)

(72) Inventor: Mika Inoue, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/369,218

(22) Filed: Jul. 7, 2021

(65) Prior Publication Data
US 2022/0030138 A1 Jan. 27, 2022

(30) Foreign Application Priority Data
Jul. 22, 2020 (JP) .............................. JP2020-125740

(51) Int. Cl.
*H04N 1/62* (2006.01)
*G06V 30/40* (2022.01)
*G06V 30/10* (2022.01)
*H04N 1/40* (2006.01)
*B41M 1/10* (2006.01)

(52) U.S. Cl.
CPC .............. *H04N 1/62* (2013.01); *G06V 30/40* (2022.01); *B41M 1/10* (2013.01); *G06V 30/10* (2022.01); *H04N 1/40087* (2013.01); *H04N 2201/0094* (2013.01)

(58) Field of Classification Search
None
See application file for complete search history.

(56) References Cited

U.S. PATENT DOCUMENTS

| 5,966,464 A | * | 10/1999 | Kojima ................ G06K 9/6292 382/304 |
| 2002/0012462 A1 | * | 1/2002 | Fujiwara .............. G06V 30/413 382/165 |
| 2005/0180645 A1 | | 8/2005 | Hasegawa et al. |
| 2006/0008148 A1 | * | 1/2006 | Mochizuki ........... G06V 30/158 382/182 |

(Continued)

FOREIGN PATENT DOCUMENTS

| JP | 10-069517 | 3/1998 |
| JP | 2005-259017 | 9/2005 |

(Continued)

*Primary Examiner* — Haris Sabah
(74) *Attorney, Agent, or Firm* — Harness, Dickey & Pierce, P.L.C.

(57) ABSTRACT

An information processing apparatus includes circuitry configured to recognize a character in an original image by character recognition, to generate a font, calculate a certainty factor of the character recognition, determine a color of the font based on the certainty factor by a first processing method, and determine a replacement color by a second processing method based on the certainty factor, and convert the original image into an editable electronic document including the font and an image in which the character pixel has the replacement color. The replacement color is a color to which a color of a character pixel of the recognized character is replaced.

20 Claims, 17 Drawing Sheets

(56) References Cited

U.S. PATENT DOCUMENTS

2017/0289766 A1* 10/2017 Scott .................... H04W 8/005
2020/0412916 A1    12/2020 Kobayashi et al.

FOREIGN PATENT DOCUMENTS

| JP | 2005-352735 | 12/2005 |
| JP | 2014-137605 | 7/2014 |
| JP | 2015-060470 | 3/2015 |
| WO | 2006/009105 A1 | 1/2006 |

* cited by examiner

INFORMATION PROCESSING APPARATUS, METHOD AND NON-TRANSITORY RECORDING MEDIUM STORING PROGRAM CODES FOR REPLACING COLOR OF CHARACTER PIXEL BASED ON SELECTION OF FIRST AND SECOND PROCESSING METHODS

CROSS-REFERENCE TO RELATED APPLICATION

This patent application is based on and claims priority pursuant to 35 U.S.C. § 119(a) to Japanese Patent Application No. 2020-125740, filed on Jul. 22, 2020, in the Japan Patent Office, the entire disclosure of which is hereby incorporated by reference herein.

BACKGROUND

Technical Field

Embodiments of the present discloser relate to an information processing apparatuses, an information processing method, and a recording medium.

Related Art

When a printed document can be converted to an electronic document (document data) before printing, it is highly convenient for reuse. Therefore, there is a technique in which a printed document is read by a scanner, subjected to image area separation, subjected to optical character recognition (OCR), and converted into document data, for example, in an Office Open Extensible Markup Language (XML) document format adopted by MICROSOFT OFFICE (registered trademark).

When a character is superimposed on an image, it is desirable to extract character pixels from the image and erase the trace of the character from the image in order to improve the reusability of the image itself for reuse of the data. In this conversion technique, a font that has been subjected to optical character recognition (OCR) is superimposed on the image. It is preferable to erase the trace of the character in order to prevent apparent interference with the superimposed font.

In view of the above, there are techniques of image processing on the OCR result. However, none of the techniques considers the combination of font color and character pixel color.

SUMMARY

An embodiment of the present disclosure provides an information processing apparatus that includes circuitry configured to recognize a character in an original image by character recognition, to generate a font, calculate a certainty factor of the character recognition, determine a color of the font based on the certainty factor by a first processing method, and determine a replacement color by a second processing method based on the certainty factor, and convert the original image into an editable electronic document including the font and an image in which the character pixel has the replacement color. The replacement color is a color to which a color of a character pixel of the recognized character is replaced.

Another embodiment provides method for converting an image. The method includes recognizing a character in an original image by character recognition, to generate a font; calculating a certainty factor of the character recognition; determining a color of the font based on the certainty factor by a first processing method; determining a replacement color by a second processing method based on the certainty factor, and converting the original image into an editable electronic document including the font and an image in which the character pixel has the replacement color. The replacement color is a color to which a color of a character pixel of the recognized character is replaced.

Another embodiment provides non-transitory recording medium storing a plurality of program codes which, when executed by one or more processors, causes the processors to perform the method described above.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
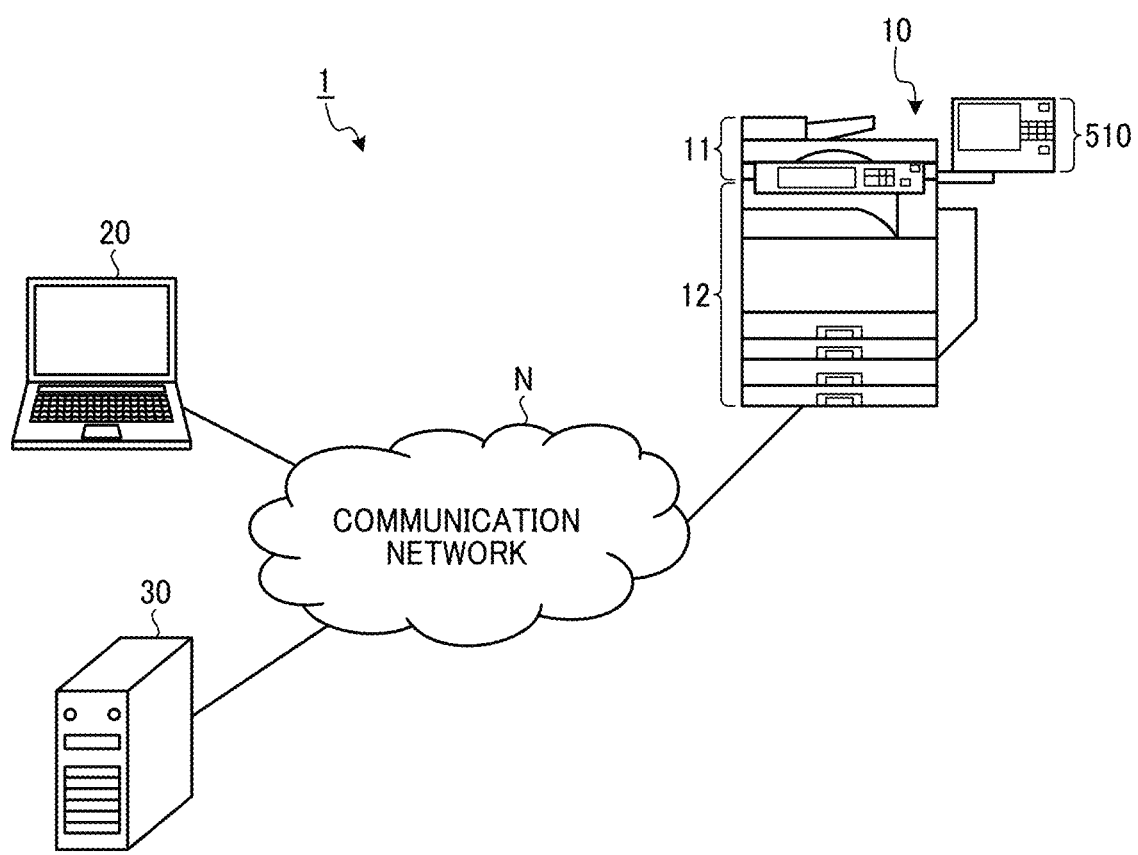
FIG. 1 is a diagram of an information processing system according to an embodiment.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, an information processing apparatus, an information processing method, and a recording medium according to embodiments of the present disclosure are described in detail with reference to the accompanying drawings. The present disclosure, however, is not limited to the following one or more embodiments, and the elements of the following one or more embodiments include elements that may be easily conceived by those skilled in the art, those being substantially the same ones, and those being within equivalent ranges. Furthermore, various omissions, substitutions, changes, and combinations of the elements may be made without departing from the gist of the following one or more embodiments.

In the description of one or more embodiments given below, the following terms are defined or have meaning as described below. "Computer software," which may be, hereinafter, simply referred to as "software," is defined as a program related to operation of a computer or any data to be used in processing performed by a computer according to such a program. "Application software," which may be simply referred to as an "application", is a general term for any software used to perform certain processing. "Operating system," which is hereinafter simply referred to as an "OS," is software for controlling a computer, such that software, such as application software, is able to use computer resources. The OS controls basic operation of the computer, such as input or output of data, management of hardware resources such as a memory or a hard disk, and processes to be performed. The application operates by utilizing functions provided by the OS. The "program" is a set of instructions for causing the computer to perform processing to have a certain result. Data or an instruction that is not a direct command to a computer is not a program itself. However, data that defines processing to be performed by the program is interpreted as equivalent to the program. For example, a data structure, which is a logical structure of data described by an interrelation between data elements, may be interpreted as equivalent to the program.

Hereinafter, a multifunctional peripheral (MFP) is described as an example of the information processing apparatus according to the present disclosure, but the present disclosure is not limited to the example. In one example, the information processing apparatus can be a personal computer (PC) or the like that performs image processing on an image read by a scanner. Note that the MFP is a device having a plurality of different functions such as a copier function, a scanner function, a printer function, and a facsimile function.

Overall Configuration of Information Processing System

FIG. 1 is a diagram illustrating an example of an overall configuration of an information processing system according to one or more embodiments of the disclosure. A description is given of an overall configuration of an information processing system 1 according to the present embodiment with reference to FIG. 1.

As illustrated in FIG. 1, the information processing system 1 includes an MFP 10, a PC 20, and a file server 30, which can perform data transmission and reception with each other via a communication network N. The communication network N is, for example, a local area network (LAN), an intranet, the Internet, or a network configured by a mixture thereof, and may include not only a wired network but also a wireless network.

The MFP 10 is an example of an information processing apparatus having a scanner unit 11 that reads a document and a printer unit 12 that forms an image on a recording medium. The MFP 10 extracts a text (character string) by the OCR from an image read with the scanner unit 11, and obtains, based on the read image and the text, an editable document data, for example, in an Office Open XML document format. When an automatic document feeder (ADF) is provided, the scanner unit 11 reads the document sheet set on the ADF. The printer unit 12 forms an image on a recording medium based on the image data according to an operation instruction from a user via a control panel 510, or an operation instruction from the PC 20 or the file server 30 via a communication network.

The PC 20 is an information processing apparatus that transmits, for example, image data or document data stored in the file server 30 to the MFP 10 to execute image forming process. In the example illustrated in FIG. 1, the information processing system 1 includes one PC 20, but can include a plurality of PCs.

The file server 30 is a server that stores image data, document data, and the like in order to share such data on the communication network N.

Hardware Configuration of MFP

Figure 2:
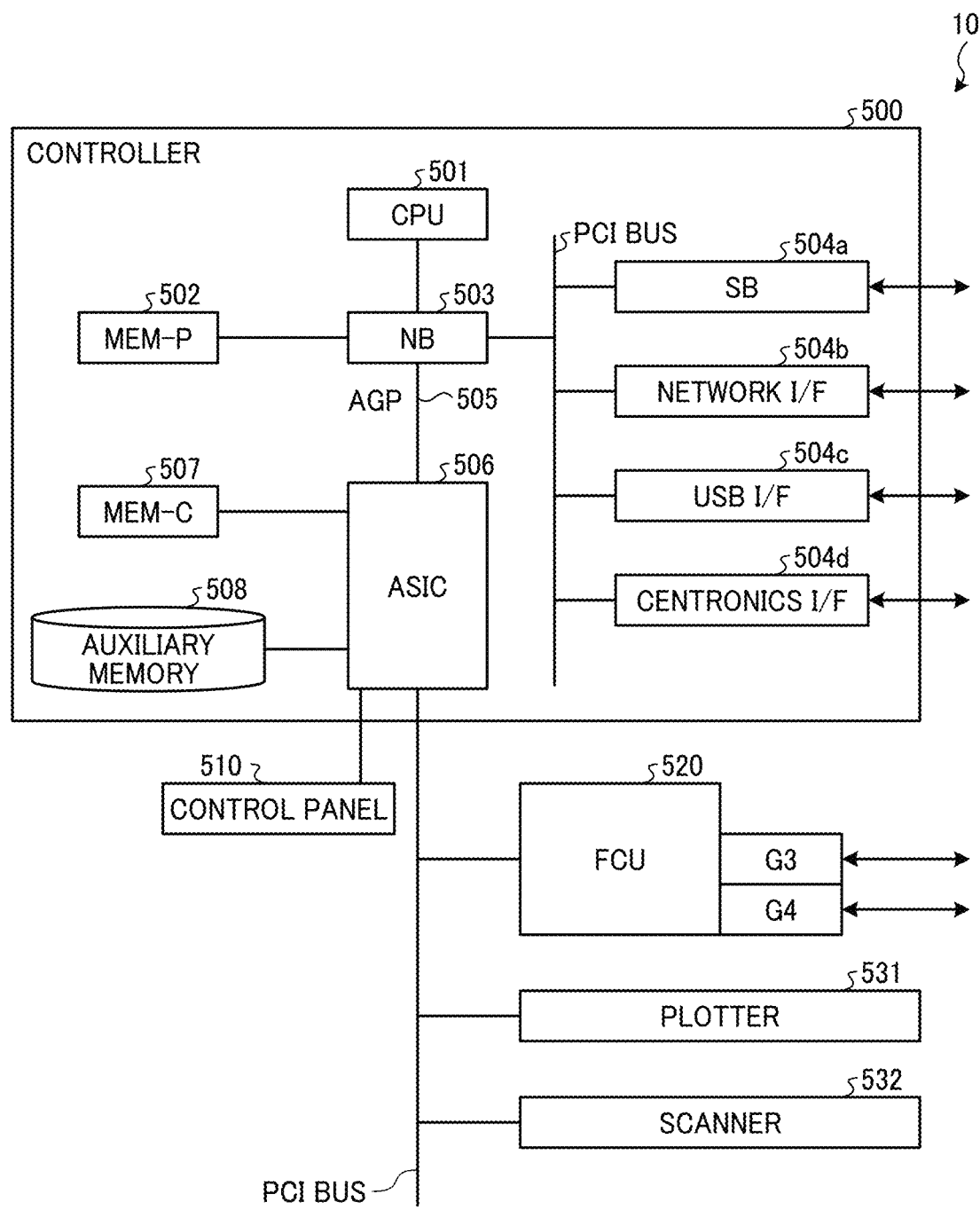
FIG. 2 is a block diagram illustrating an example of a hardware configuration of the MFP of the information processing system illustrated in FIG. 1.

FIG. 2 is a block diagram illustrating an example of a hardware configuration of the MFP according to the present embodiment of the disclosure. A description is given below of the hardware configuration of the MFP 10 according to the present embodiment with reference to FIG. 2.

As illustrated in FIG. 2, the MFP 10 includes a controller 500, the control panel 510, a facsimile control unit (FCU) 520, a plotter 531, and a scanner 532 that are connected by a peripheral component interconnect (PCI) bus.

The controller 500 is a device that controls the entire operation, drawing, and communication performed by the MFP 10 and controls input from the control panel 510.

The control panel 510 is, for example, a touch panel. The control panel 510 is a device that receives an input to the controller 500 (input function) and displays the status of the MFP 10 (display function). The control panel 510 is directly connected to an application-specific integrated circuit (ASIC) 506 described later.

The FCU 520 is a device that provides a facsimile function, and is connected to the ASIC 506 via, for example, the PCI bus.

The plotter 531 is a device that provides a printing function, and is connected to the ASIC 506 via, for example, the PCI bus. The scanner 532 is a device that provides a scanner function, and is connected to the ASIC 506 via, for example, the PCI bus.

The controller 500 includes a central processing unit (CPU) 501, a system memory (MEM-P) 502, a north bridge (NB) 503, a south bridge (SB) 504a, a network interface (I/F) 504b, a universal serial bus (USB) I/F 504c, a Centronics I/F 504d, the ASIC 506, a local memory (MEM-C) 507, and an auxiliary memory 508.

The CPU 501 controls the entire operation of the MFP 10. The CPU 501 is connected to a chipset including the system memory 502, the NB 503, and the SB 504a, and is connected to other devices via the chipset.

The system memory 502 is a memory for storing programs and data, loading programs and data, and storing drawing data of a printer. The system memory 502 includes a read only memory (ROM) and a random access memory (RAM). The ROM is a read-only memory for storing programs and data. The RAM is a writable and readable memory for loading programs and data, and storing drawing data of the printer.

The NB 503 is a bridge for connecting the CPU 501 to the system memory 502, the SB 504a, and an Accelerated Graphics Port (AGP) bus 505. The NB 503 includes a memory controller that controls reading from and writing to the system memory 502, a peripheral component interconnect (PCI) master, and an AGP target.

The SB 504a connects the NB 503 with PCI devices and peripheral devices. The SB 504a is connected to the NB 503 via the PCI bus, and the network I/F 504b, the USB I/F 504c, and the Centronics I/F 504d are connected to the PCI bus.

The network I/F 504b is, for example, an interface compliant with ETHERNET (registered trademark) and is capable of establishing communications in compliance with Transmission Control Protocol (TCP)/Internet Protocol (IP).

The USB I/F 504c is an interface for data communication with USB devices. The Centronics I/F 504d is an interface for parallel data transfer.

The AGP bus 505 is a bus interface for graphics accelerator cards to accelerate graphics processing. The AGP bus 505 can speed up the graphics accelerator card by directly accessing the system memory 502 with high throughput.

The ASIC 506 is an integrated circuit (IC) for image processing applications having hardware elements for image processing. The ASIC 506 serves as a bridge that connects the AGP bus 505, the PCI bus, the auxiliary memory 508, and the local memory 507 with each other. The ASIC 506 includes a PCI target, an AGP master, an arbiter (ARB) as a central processor of the ASIC 506, a memory controller for controlling the local memory 507, a plurality of Direct Memory Access controllers (DMACs) capable of rotating image data with a hardware logic, and a PCI unit that transfers data between the plotter 531 and the scanner 532 via the PCI bus. For example, the FCU 520, the plotter 531, and the scanner 532 are connected to the ASIC 506 via the PCI bus.

The local memory 507 is a memory used as a copy image buffer and a code buffer.

The auxiliary memory 508 is a storage area such as a hard disk drive (HDD), a solid state drive (SSD), a Secure Digital (SD) card, or flash memory, and stores image data, programs, font data, and forms.

The program designed for the MFP 10 may be recorded on a computer-readable recording medium, such as the auxiliary memory 508, for distribution in an installable or an executable file format.

The hardware configuration of the MFP 10 illustrated in FIG. 2 is an example. The MFP 10 may omit some of the components illustrated in FIG. 2 or include one or more components. The CPU 501 and the NB 503 may be integrated by a system on a chip (SoC).

Functional Configuration of MFP

Figure 3:
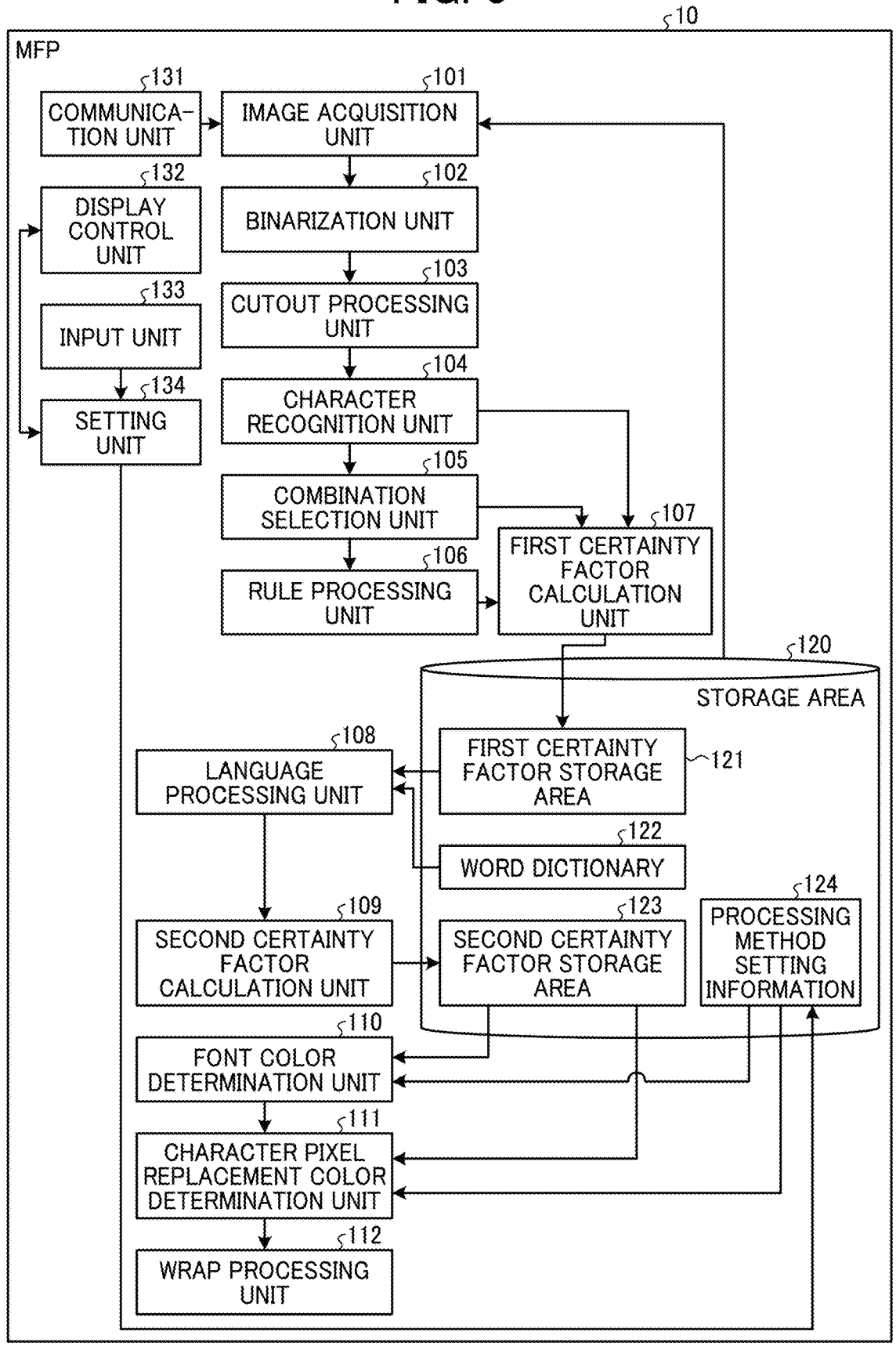
FIG. 3 is a block diagram illustrating an example of a functional configuration of the MFP illustrated in FIG. 2.
Figure 4A:
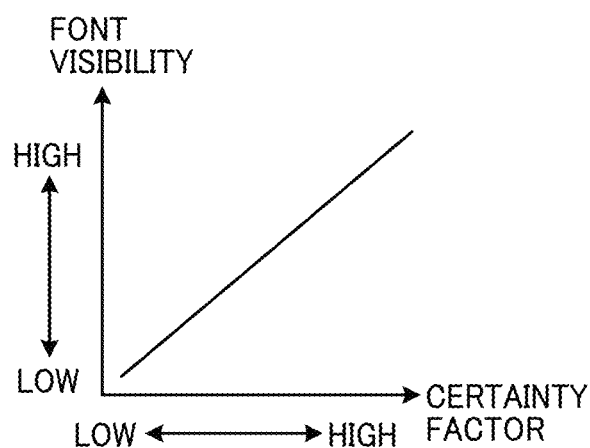
FIGS. 4A and 4B are graphs illustrating a positive correlation of a font visibility with a certainty factor and a positive correlation of degree of deletion of a character pixel with a certainty factor.
Figure 4B:
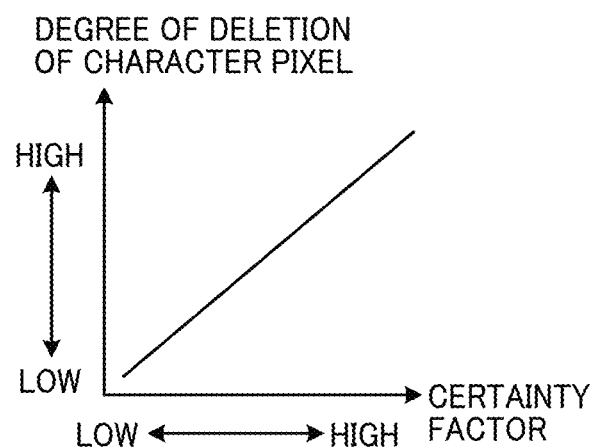
Figure 5A:
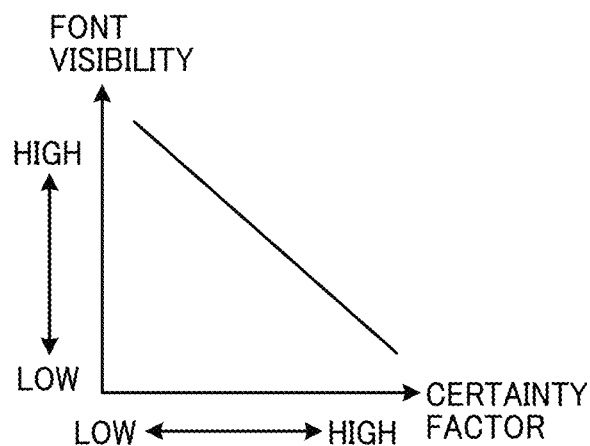
FIGS. 5A and 5B are graphs illustrating a negative correlation of the font visibility with the certainty factor and the degree of deletion of the character pixel with the certainty factor.
Figure 5B:
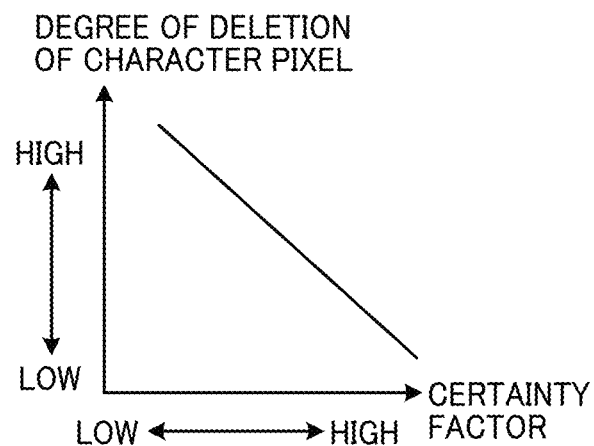

FIG. 3 is a block diagram illustrating an example of a functional configuration of the MFP according to the present embodiment. FIGS. 4A and 4B are graphs illustrating a positive correlation of a font visibility with a certainty factor and a positive correlation of degree of deletion of a character pixel with the certainty factor. FIGS. 5A and 5B are graphs illustrating a negative correlation of the font visibility with a certainty factor and a negative correlation of degree of deletion of a character pixel with the certainty factor. Descriptions are given below of the functional configuration and operation of the MFP 10 according to the present embodiment, with reference to FIGS. 3 to 5B.

As illustrated in FIG. 3, the MFP 10 includes an image acquisition unit 101, a binarization unit 102, a cutout processing unit 103, a character recognition unit 104, a combination selection unit 105, a rule processing unit 106, a first certainty factor calculation unit 107, a language processing unit 108, a second certainty factor calculation unit 109, a font color determination unit 110 (first determination unit), a character pixel replacement color determination unit 111 (second determination unit), a wrap processing unit 112 (an example of a superimposition unit), a storage area 120, a communication unit 131, a display control unit 132, an input unit 133, and a setting unit 134.

The image acquisition unit 101 is a functional unit that acquires data obtained by scanning an image on a document with the scanner 532 as scan image data. The image acquisition unit 101 may acquire the image data from the storage area 120 where the image data obtained by the scanner 532 is stored.

The binarization unit 102 is a functional unit that generates a binary image by binarizing the image data (data of an original image) acquired by the image acquisition unit 101. Specifically, when the image data is a color image, the binarization unit 102 calculates brightness by a known luminance-chrominance conversion (RGB to YCbCr conversion), and generates a binary image using a known discriminant analysis method. When the image data is a gray scale image, the binarization unit 102 omits calculating brightness, and directly generates a binary image using the discriminant analysis method. The image data (of the original image) acquired by the image acquisition unit 101 and the binary image binarized by the binarization unit 102 may be stored in the storage area 120.

The cutout processing unit 103 is a functional unit that cuts out characters, with a circumscribed rectangle thereof, from the binary image, which is generated by the binarization unit 102. For example, the cutout processing unit 103 obtains a projection in the row direction of the binary image, cuts out each character row using the projection, and cuts out each character using a projection in the direction perpendicular to the cutout character row, or, alternatively, connects circumscribed rectangles of connection components of black pixels, thereby cutting out each character. The character image portion thus cut-out by the cutout processing unit 103 is referred to as a character image.

The character recognition unit 104 is a functional unit that normalizes the character image cut out by the cutout processing unit 103, extracts a feature value of the normalized character image, and checks the matching between the feature value and a content of a pattern dictionary stored in the storage area 120, thereby recognizing (character recognition) one or more candidate characters having a high degree of similarity or a low degree of difference (distance). In this case, the character recognition unit 104 may recognize a candidate character by identifying a character code, for example.

The combination selection unit 105 is a functional unit that selects an optimal combination (path) of candidate characters determined by the character recognition unit 104, regarding a sequence of characters.

The rule processing unit 106 is a functional unit that corrects the candidate character recognized by the character recognition unit 104 according to a given rule. Examples of the rule include relative position information of the character in a line (for example, delimiter or separator such as "•," and ","; size information of the character (for example, distinction between uppercase and lowercase such as whether the character is "C" or "c"); and character type information. In the example of Japanese character type information, when there is a kanji shaped like a long lateral bar (representing "one") in a katakana character string, the character is corrected to a long phonetic symbol "-."

The first certainty factor calculation unit 107 is a functional unit that calculates a certainty factor (first certainty factor) of the candidate character (or the candidate character corrected according to the rule). Specifically, the first certainty factor calculation unit 107 calculates the certainty factor by Dempster-Shafer theory using, as evidences, an evaluation value (for example, the quotient resulting from division of the distance from the pattern dictionary by the total number of contours) of the candidate character recognized by the character recognition unit 104; an evaluation value of an optimum combination selected by the combination selection unit 105, and information on the rule applied by the rule processing unit 106. The certainty factor mentioned here is an index value indicating to what degree a recognized character is probable, and is represented by a numerical value of 0 to 100 in percentages (%), for example. The processing starting from the cutout processing by the cutout processing unit 103 to the first certainty factor calculation by the first certainty factor calculation unit 107 may be the same as those described in, for example, U.S. Pat. No. 5,966,464. The upper left and lower right coordinates of the circumscribed rectangle of the character image cut out by the cutout processing unit 103, the candidate character (character code) recognized by the character recognition unit 104, and the first certainty factor calculated by the first certainty factor calculation unit 107 may be stored in a first certainty factor storage area 121 (described later) of the storage area 120.

When the respective first certainty factors of the character images cut out by the cutout processing unit 103 are stored in the first certainty factor storage area 121 of the storage area 120, the language processing unit 108 performs a known morphological analysis on a character string that is a sequence of candidate characters (character codes) stored in the first certainty factor storage area 121, to extract a noun. The language processing unit 108 then compares the noun with a word in a word dictionary 122 (hereinafter referred to as "dictionary entry word") of the storage area 120, and replaces the noun with the dictionary entry word matching the noun. The word dictionary 122 is illustrated in FIG. 3 and described later. When the language processing unit 108 determines that the noun matches a dictionary entry word, the noun is stored, for example, in a second certainty factor storage area 123 (described later) of the storage area 120. Details of the language processing by the language processing unit 108 will be described later with reference to FIGS. 6 and 8.

The second certainty factor calculation unit 109 is a functional unit that calculates the maximum of the first certainty factors of the characters of the noun replaced by the dictionary entry word by the language processing unit 108 as the second certainty factor of each character of the noun. The second certainty factor calculated by the second certainty factor calculation unit 109 is stored, for example, in the second certainty factor storage area 123 (described later) of the storage area 120. Details of the second certainty factor calculation by the second certainty factor calculation unit 109 will be described later with reference to FIGS. 6 and 9.

The font color determination unit 110 is a functional unit that determines a font color (first color) of the noun (font) extracted by the language processing unit 108. The font color determination unit 110 determines the font color based on a character color (original character color) calculated from a pixel value of the character image portion of the original image corresponding to the character image cut out by the cutout processing unit 103 based on an assumption that font visibility has a positive correlation or a negative correlation with the certainty factor. The term "font" refers to not only a noun having been subjected to language processing by the language processing unit 108 but also each character of the noun. The positive correlation of the font visibility with the certainty factor is such a relationship that the font visibility increases as the certainty factor increases, as illustrated in FIG. 4A. On the other hand, the negative correlation of the font visibility with the certainty factor is such a relationship that the font visibility decreases as the certainty factor increases, as illustrated in FIG. 5A. Details of the font color determination by the font color determination unit 110 will be described later with reference to FIGS. 7 and 10.

The character pixel replacement color determination unit 111 is a functional unit that determines a character pixel replacement color (second color) to which the color of the character portion in the original image corresponding to the character image based on an original background color calculated from the pixel value of a portion of the original image other than the character image portion corresponding to the character image cut out by the cutout processing unit 103. The character pixel replacement color determination unit 111 determines the character pixel replacement color in a case where the degree of deletion of the character pixel in the original image has a positive correlation or a negative correlation with the certainty factor. The positive correlation of the degree of deletion of the character pixel in the original image with the certainty factor is such a relationship that the degree of deletion of the character pixel increases as the certainty factor increases, as illustrated in FIG. 4B. On the other hand, the negative correlation of the degree of deletion of the character pixel in the original image with the certainty factor is such a relationship that the degree of deletion of the character pixel in the original image decreases as the certainty factor increases, as illustrated in FIG. 5B. Details of the character pixel replacement color determination by the character pixel replacement color determination unit 111 will be described later with reference to FIGS. 7 and 11.

The wrap processing unit 112 is a functional unit that superimposes, on the original image, a replacement character pixel having the character pixel replacement color determined by the character pixel replacement color determination unit 111 and a font having the font color determined by the font color determination unit 110, and performs known file wrap processing such as XML wrap processing. The file format of the document data generated by the wrap processing unit 112 is, for example, the Office Open XML format. The Office Open XML format includes a plurality of folders and a plurality of files such as "document.xml" describing a text content, "fontTable.xml" defining a font to be used, and "styles.xml" defining the style of the text. Contents of such files are text data in the xml format. Visual recognition thereof is easier compared with binary data, and the file can be easily edited. For example, the wrap processing unit 112 generates the Office Open XML format files, zips the files into one file, and adds an extension "docx" to the name of the compressed file, thereby generating a document file (document data or electronic document) that is editable.

The storage area 120 is a functional unit that stores various programs and various types of data. Specifically, the storage area 120 stores, for example, image data (original image) read by the scanner 532, a binary image binarized by the binarization unit 102, and the pattern dictionary used by the character recognition unit 104 for recognition processing. As illustrated in FIG. 3, the storage area 120 includes the first certainty factor storage area 121, the word dictionary 122, and the second certainty factor storage area 123, and stores processing method setting information 124.

The first certainty factor storage area 121 stores the upper left and lower right coordinates of the circumscribed rectangle of the character image cut out by the cutout processing unit 103, the candidate character (character code) recognized by the character recognition unit 104, and the first certainty factor calculated by the first certainty factor calculation unit 107. The word dictionary 122 is a dictionary including various words used by the language processing unit 108 in the language processing. The second certainty factor storage area 123 stores the second certainty factor calculated by the second certainty factor calculation unit 109 and the noun determined to correspond to a dictionary entry word by the language processing unit 108. The processing method setting information 124 is setting information on the methods for the font color determination and the character pixel replacement color determination set by the setting unit 134 described later.

The storage area 120 is implemented by at least one of the system memory 502, the local memory 507, and the auxiliary memory 508 illustrated in FIG. 2.

The communication unit 131 is a functional unit that performs data communication with external devices (for example, the PC 20 and the file server 30). The communication unit 131 is implemented by the network I/F 504b and the CPU 501 illustrated in FIG. 2 executing a program.

The display control unit 132 is a functional unit that controls display operation of the control panel 510.

The input unit 133 is a functional unit that receives an input operation performed by a user. The input unit 133 is implemented by the input function of the control panel 510 illustrated in FIG. 2.

The setting unit 134 is a functional unit that sets the processing method (first processing method) of the font color determination and the processing method (second processing method) of the character pixel replacement color determination. Details of the operation of the setting unit 134 will be described later with reference to FIG. 34.

The image acquisition unit 101, the binarization unit 102, the cutout processing unit 103, the character recognition unit 104, the combination selection unit 105, the rule processing unit 106, the first certainty factor calculation unit 107, the language processing unit 108, the second certainty factor calculation unit 109, the font color determination unit 110, the character pixel replacement color determination unit 111, the wrap processing unit 112, the display control unit 132, and the setting unit 134 described above are implemented by, for example, the CPU 501, illustrated in FIG. 2, executing a program. At least one of the functional units described above may be implemented by an integrated circuit such as an ASIC or a field-programmable gate array (FPGA).

Each functional unit of the MFP 10 illustrated in FIG. 3 is a conceptual function, and the functional configuration of the MFP 10 is not limited thereto. For example, two or more of the functional units of the MFP 10 illustrated as independent units in FIG. 3 may be integrated into a single functional unit. By contrast, a plurality of functions provided by one functional unit of the MFP 10 illustrated in FIG. 3 may be divided and allocated to a plurality of functional units.

Figure 6:
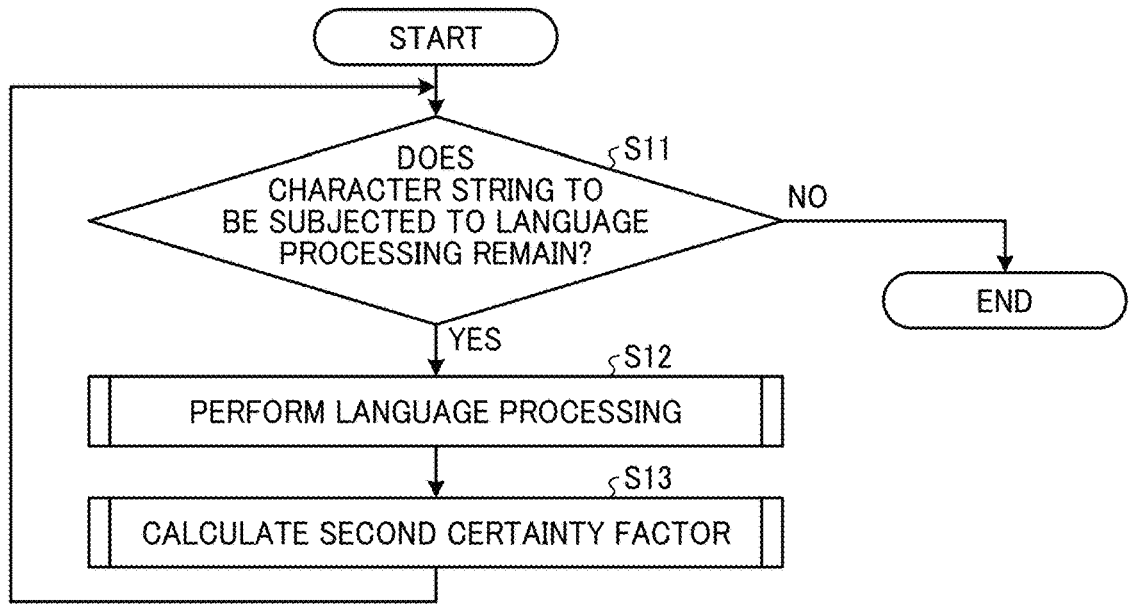
FIG. 6 is a flowchart illustrating an example of a sequence of language processing and second certainty factor calculation processing performed by the MFP illustrated in FIG. 3.

Repetitive Process of Language Processing and Second Certainty Factor Calculation FIG. 6 is a flowchart illustrating an example of a sequence of the language processing and the second certainty factor calculation performed by the MFP according to the present embodiment. Referring to FIG. 6, a description is given of the repetitive process of the language processing and the second certainty factor calculation by the MFP 10.

Step S11

The language processing unit 108 determines whether or not a character string that is a sequence of candidate characters not yet subjected to the language processing remains in the first certainty factor storage area 121. When the character string remains (step S11: Yes), the process proceeds to step S12. When no character string remains (step S11: No), the repetition process ends.

Step S12

The language processing unit 108 receives the character string, which is a sequence of candidate characters not yet subjected to language processing, from the first certainty factor storage area 121, and executes language processing. Details of the language processing by the language processing unit 108 will be described later with reference to FIG. 8. The process proceeds to step S13.

Step S13

The second certainty factor calculation unit 109 inputs, from the first certainty factor storage area 121, the respective first certainty factors of the characters of the noun determined to correspond to the dictionary entry word by the language processing unit 108. The second certainty factor calculation unit 109 then calculates the second certainty factor of the characters based on the first certainty factors of the characters. The second certainty factor calculation unit 109 stores the calculated second certainty factor in the second certainty factor storage area 123. Details of the second certainty factor calculation process by the second certainty factor calculation unit 109 will be described later with reference to FIG. 9. Then, the process returns to step S11.

Figure 7:
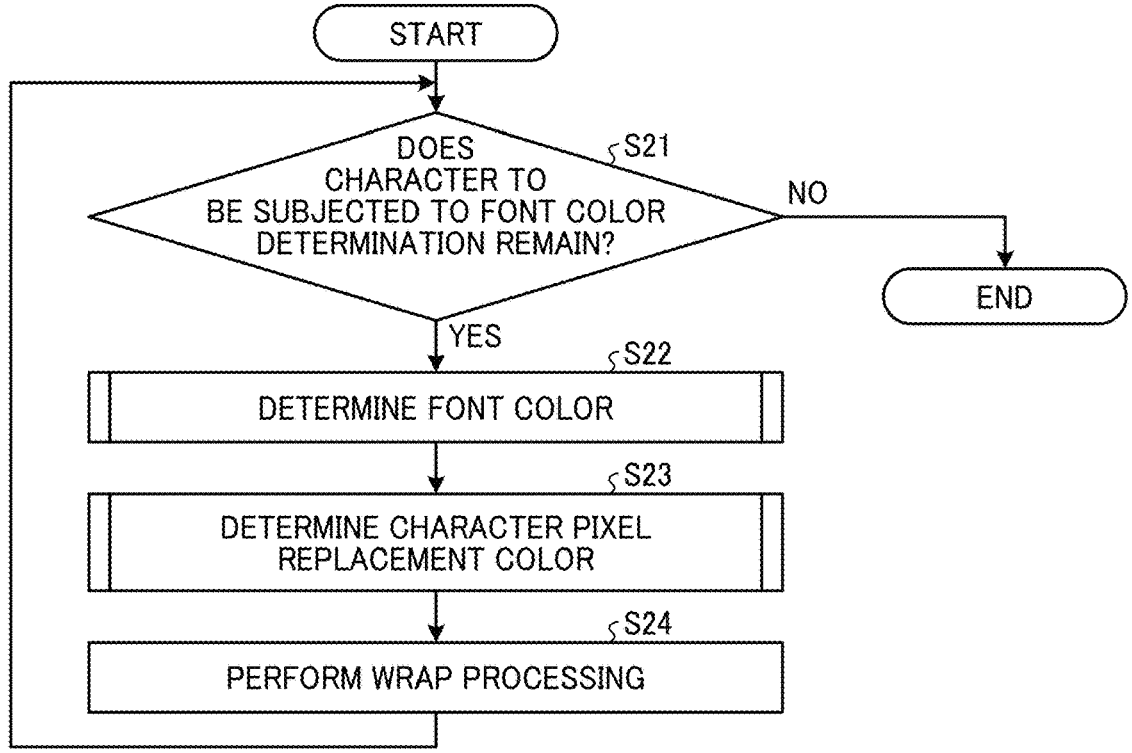
FIG. 7 is a flowchart illustrating an example of a sequence of font color determination, character pixel replacement color determination, and the wrap processing performed by the MFP illustrated in FIG. 3.

Repetitive Process of Font Color Determination and Character Pixel Replacement Color Determination FIG. 7 is a flowchart illustrating an example of a sequence of the font color determination, the character pixel replacement color determination, and the wrap processing performed by the MFP according to the present embodiment. Referring to FIG. 7, a description is given of the repetitive process of the font color determination, the character pixel replacement color determination, and the wrap processing performed by the MFP 10.

Step S21

The font color determination unit 110 determines whether the second certainty factor storage area 123 stores a character that has been subjected to the second certainty factor calculation by the second certainty factor calculation unit 109 but is not yet subjected to the font color determination. When a character remains in the second certainty factor storage area 123 (step S21: Yes), the process proceeds to step S22. When no character remains (step S21: No), the repeating process ends.

Step S22

The font color determination unit 110 inputs, from the second certainty factor storage area 123, the character that is not yet subjected to the font color determination and performs the font color determination of the character. Details of the font color determination by the font color determination unit 110 will be described later with reference to FIG. 10. Subsequently, the process proceeds to S23.

Step S23

The character pixel replacement color determination unit 111 determines the color of the character image portion of the original image corresponding to the character for which the font color has been determined by the font color determination unit 110 (character pixel replacement color determination). Details of the character pixel replacement color determination process by the character pixel replacement color determination unit 111 will be described later with reference to FIG. 11. Then, the process proceeds to step S24.

Step S24

The wrap processing unit 112 superimposes, on the original image, a replacement character pixel having the character pixel replacement color determined by the font color determination unit 110 and a font having the font color determined by the character pixel replacement color determination unit 111, and performs file wrap processing such as XML wrap processing. Then, the process returns to step S21.

Detail of Language Processing

Figure 8:
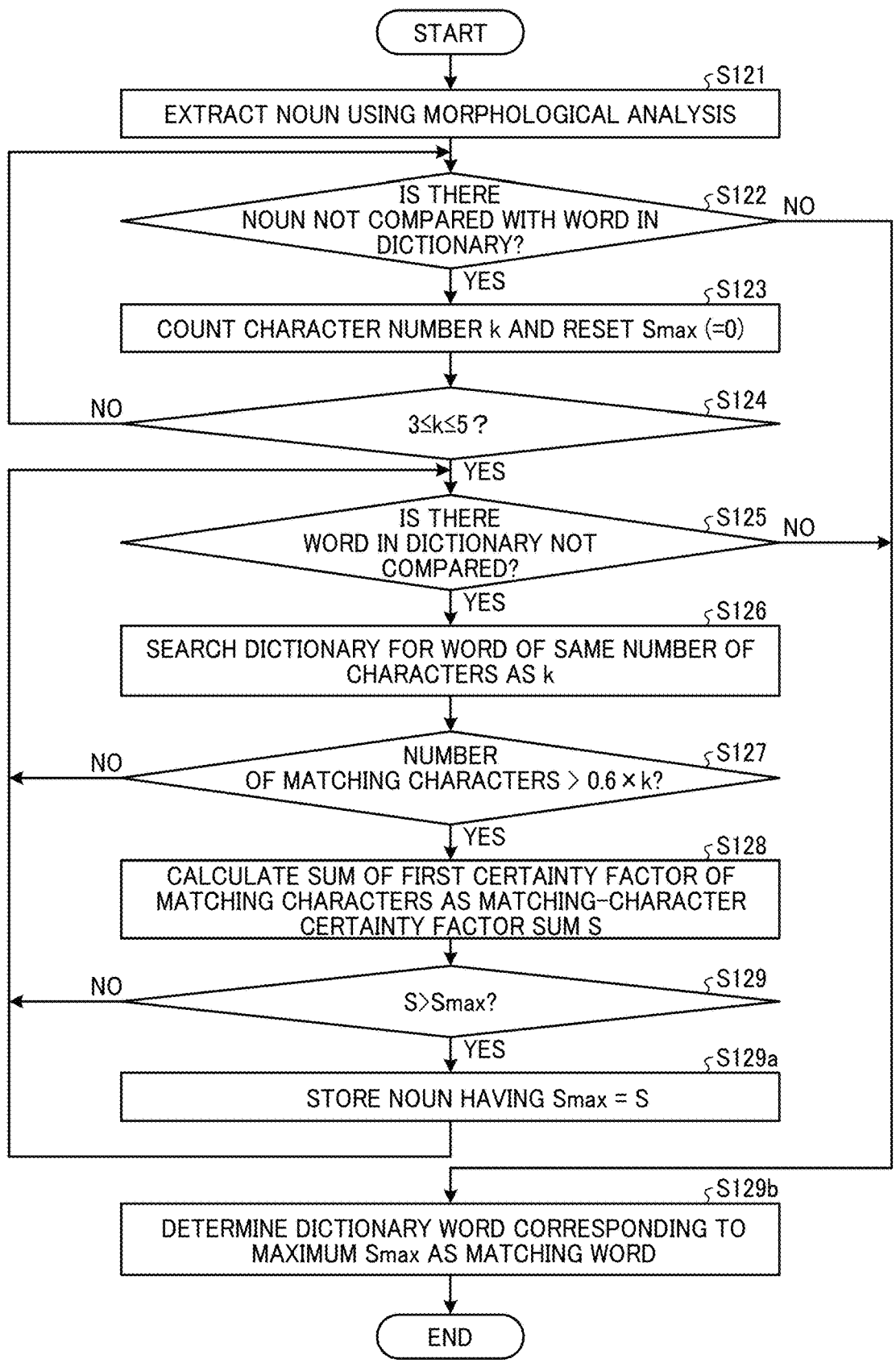
FIG. 8 is a flowchart illustrating an example of a sequence of the language processing performed by the MFP illustrated in FIG. 3.

FIG. 8 is a flowchart illustrating an example of the language processing performed by the MFP according to the present embodiment. The language processing by the language processing unit 108 of the MFP 10 will be described in detail with reference to FIG. 8.

Step S121

When the respective first certainty factors corresponding to the character images cut out by the cutout processing unit 103 are stored in the first certainty factor storage area 121 of the storage area 120, the language processing unit 108 inputs a character string that is a sequence of candidate characters (character codes) from the first certainty factor storage area 121. Then, the language processing unit 108 performs known morphological analysis on the input character string to extract a noun. Then, the process proceeds to step S122.

Step S122

The language processing unit 108 determines whether any one of the extracted nouns is not yet compared with the words (dictionary entry word) in the word dictionary 122 of the storage area 120. In response to a determination that there is an extracted noun not compared with the dictionary entry words (step S122: Yes), the process proceeds to step S123. In response to a determination that all the extracted nouns have been compared with the dictionary entry words (step S122: No), the process proceeds to step S129b.

Step S123

The language processing unit 108 counts the number of characters (character number k) of the extracted noun and resets, to 0, a maximum value Smax of the sum of the first certainty factors. Then, the process proceeds to step S124.

Step S124

The language processing unit 108 determines whether or not the counted character number k is in a predetermined range, for example, 3≤k≤5 (three characters or more and five characters or less). When the character number k is in the predetermined range, such as 3≤k≤5, (step S124: Yes), the process proceeds to step S125. When the character number k is not in the predetermined range (step S124: No), the process returns to step S122. The range of the character number k of the extracted noun may be different from 3≤k≤5 and empirically obtained and stored in a memory, for example.

Step S125

The language processing unit 108 determines whether or not the word dictionary 122 includes a dictionary entry word that has not been compared with the extracted noun. In response to a determination that there is a dictionary entry word not compared (step S125: Yes), the process proceeds to step S126. In response to a determination that all the dictionary entry words have been compared (step S125: No), the process proceeds to step S129b.

Step S126

The language processing unit 108 searches the word dictionary 122 for a dictionary entry word having the same number of characters as the character number k. Then, the process proceeds to step S127.

Step S127

The language processing unit 108 compares the characters of the word retrieved from the word dictionary 122 with the characters of the noun having the character number k, and determines whether or not the number of matching characters is greater than a threshold. For example, the character number k is multiplied by a coefficient (e.g., 0.6) to obtain the threshold (0.6×k). In response to a determination that the number of matching characters is greater than 0.6×k (step S127: Yes), the process proceeds to step S128. In response to a determination that the number of matching characters is equal to or smaller than 0.6×k (step S127: No), the process returns to step S125. The coefficient multiplied with the character number k to obtain the threshold of the number of matching characters is not limited to 0.6, but may be another value.

Step S128

The language processing unit 108 sums the first certainty factors of only the matching characters of the noun, and sets the sum as a matching-character certainty factor sum S. The matching characters are the characters each of which matches a character of the dictionary entry word. Then, the process proceeds to step S129.

Step S129

The language processing unit 108 determines whether or not the matching-character certainty factor sum S is greater than the maximum value Smax. When the matching-character certainty factor sum S is greater than the maximum value Smax (step S129: Yes), the process proceeds to step S129a. When the matching-character certainty factor sum S is equal to or smaller than the maximum value Smax (step S129: No), the process returns to step S125.

Step S129a

The language processing unit 108 sets the matching-character certainty factor sum S as a new maximum value Smax and stores the noun corresponding to the matching-character certainty factor sum S. Then, the process returns to step S125.

Step S129b

The language processing unit 108 determines the dictionary entry word corresponding to the maximum value Smax (that matches the noun having the maximum value Smax=S) as the word matching the noun, and replaces the character string of the noun with the dictionary entry word. When matching-character certainty factor sum S is 0, the language processing unit 108 determines that there is no dictionary entry word that matches the noun, and uses the noun as is. Then, the language processing by the language processing unit 108 ends.

Details of Second Certainty Factor Calculation Processing

Figure 9:
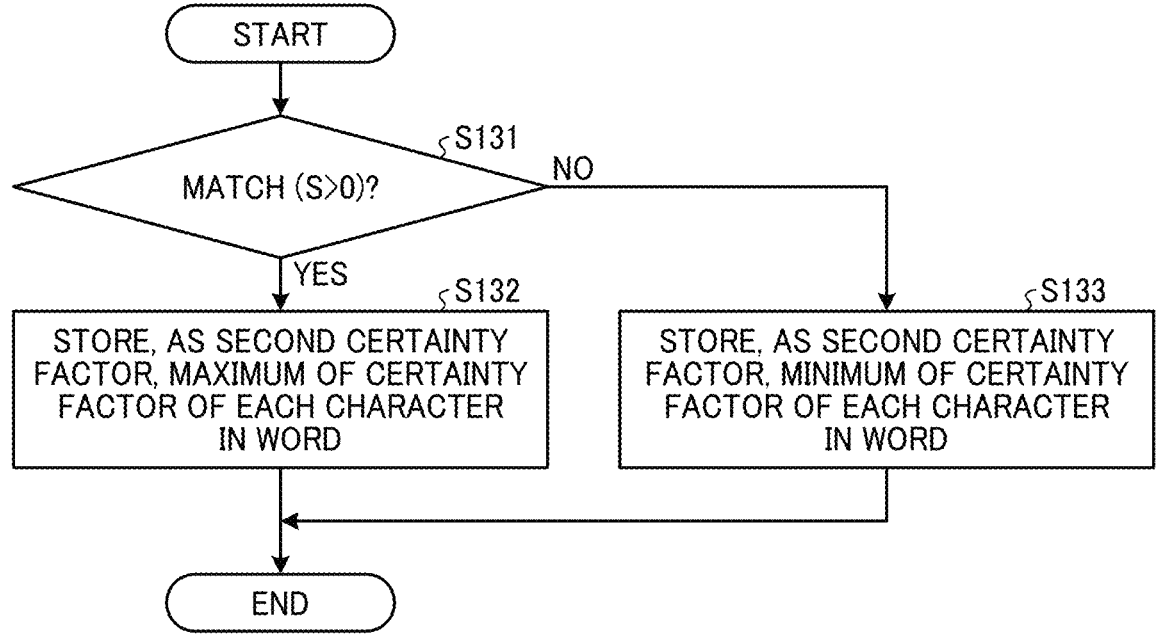
FIG. 9 is a flowchart illustrating an example of a sequence of the language processing and the second certainty factor calculation processing performed by the MFP illustrated in FIG. 3.

FIG. 9 is a flowchart illustrating an example of a sequence of the language processing and the second certainty factor calculation processing performed by the MFP according to the present embodiment. With reference to FIG. 9, the second certainty factor processing by the second certainty factor calculation unit 109 of the MFP 10 will be described in detail.

Step S131

When the noun extracted by the language processing unit 108 matches the dictionary entry word, that is, the matching-character certainty factor sum S is greater than 0 (step S131: Yes), the process proceeds to step S132. When the noun does not match the dictionary entry word, that is, the matching-character certainty factor sum S is 0 (step S131: No), the process proceeds to step S133.

Step S132

The second certainty factor calculation unit 109 calculates the maximum of the first certainty factors of the characters of the noun replaced with the dictionary entry word by the language processing unit 108. The second certainty factor calculation unit 109 stores the maximum as the second certainty factor of each of the characters in the second certainty factor storage area 123. Then, the second certainty factor calculation by the second certainty factor calculation unit 109 ends.

Step S133

When the noun extracted by the language processing unit 108 does not match the dictionary entry word, the second certainty factor calculation unit 109 calculates the minimum of the first certainty factors of the noun as the second certainty factor of each character of the noun, and stores the second certainty factor in the second certainty factor storage area 123. Then, the second certainty factor calculation by the second certainty factor calculation unit 109 ends.

Details of Font Color Determination Processing

Figure 10:
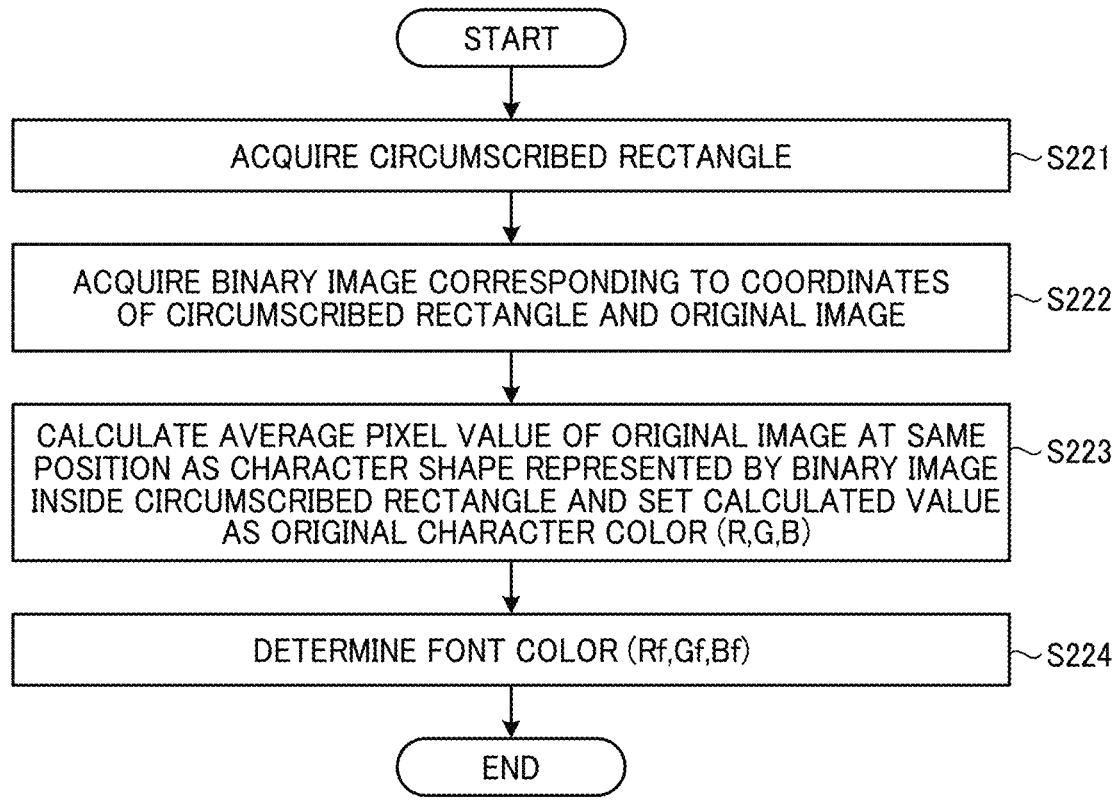
FIG. 10 is a flowchart illustrating an example of the font color determination process performed by the MFP illustrated in FIG. 3.

FIG. 10 is a flowchart illustrating an example of the font color determination process performed by the MFP according to the present embodiment. With reference to FIG. 10, the font color determination process by the font color determination unit 110 of MFP 10 will be described in detail.

In the example illustrated in FIG. 10, the font color determination unit 110 determines the font color based on the determination that the font visibility has a positive correlation with the certainty factor. That is, in the case of a positive correlation, the font color determination unit 110 considers the attention calling to be important as the certainty factor increases, and makes the font color darker. The font color determination unit 110 considers the attention calling to be less important as the certainty factor decreases, and makes the font color lighter. This method is referred to as positive-correlation visibility method. The binary character image inside the circumscribed rectangle cut out by the cutout processing unit 103 represents the shape of the character. Accordingly, the font color determination unit 110 calculates an average of the values of the pixels of the original image at the same positions as the pixels of the character image (character represented by the character image) inside the circumscribed rectangle, thereby acquiring original character color (Rc,Gc,Bc) in which the certainty factor (for example, the second certainty factor) is not reflected. The suffix c is derived from "character." In this case, the font color (Rf,Gf,Bf) of the noun (font) that has been subjected to the language processing by the language processing unit 108 is calculated and determined based on the original character color (Rc,Gc,Bc) by Equations 1 and 2 below. The suffix f is derived from "font."

When the certainty factor $C \geq Th$, $$Rf=Rc,\ Gf=Gc,\ Bf=Bc. \qquad \text{Equation 1}$$

Otherwise, $$Rf=Rc+(255-Rc)\times\{(100-C)/100\}^{0.5}$$

$$Gf=Gc+(255-Gc)\times\{(100-C)/100\}^{0.5}$$

$$Bf=Bc+(255-Bc)\times\{(100-C)/100\}^{0.5} \qquad \text{Equation 2}$$

The certainty factor C has a value of 0 to 100, and the threshold Th is, for example, 85. Although the power in Equation 2 is 0.5, the power is not limited thereto. For example, the power may be ⅓ to ½.

Step S221

The font color determination unit 110 acquires, from the first certainty factor storage area 121, the circumscribed rectangle (coordinate information) that is the target of determination of the font color. Then, the process proceeds to step S222.

Step S222

The font color determination unit 110 acquires, from the first certainty factor storage area 121, a character image portion (that is, a character image) of the binary image corresponding to the coordinates of the acquired circumscribed rectangle and the original image. Then, the process proceeds to step S223.

Step S223

The font color determination unit 110 calculates the average of the values of the pixels of the original image at the same positions as the pixels of the character image inside the circumscribed rectangle. The font color determination unit 110 uses the calculated value as the original character color (Rc,Gc,Bc). Then, the process proceeds to step S224.

Step S224

The font color determination unit 110 calculates and determines the font color (Rf,Gf,Bf) based on the calculated original character color (Rc,Gc,Bc) using the above-described Equations 1 and 2. Specifically, the font color determination unit 110 acquires the second certainty factor corresponding to the target character image from the second certainty factor storage area 123, sets the second certainty factor as the certainty factor C, and determines the font color (Rf,Gf,Bf) using the above-described Equation 1 when the certainty factor C is equal to or greater than the threshold Th (for example, 85). When the certainty factor C is smaller than the threshold value Th, the font color determination unit 110 calculates and determines the font color (Rf,Gf,Bf) using the above-described Equation 2. Then, the font color determination unit 110 ends the font color determining process.

Details of Character Pixel Replacement Color Determination Processing

Figure 11:
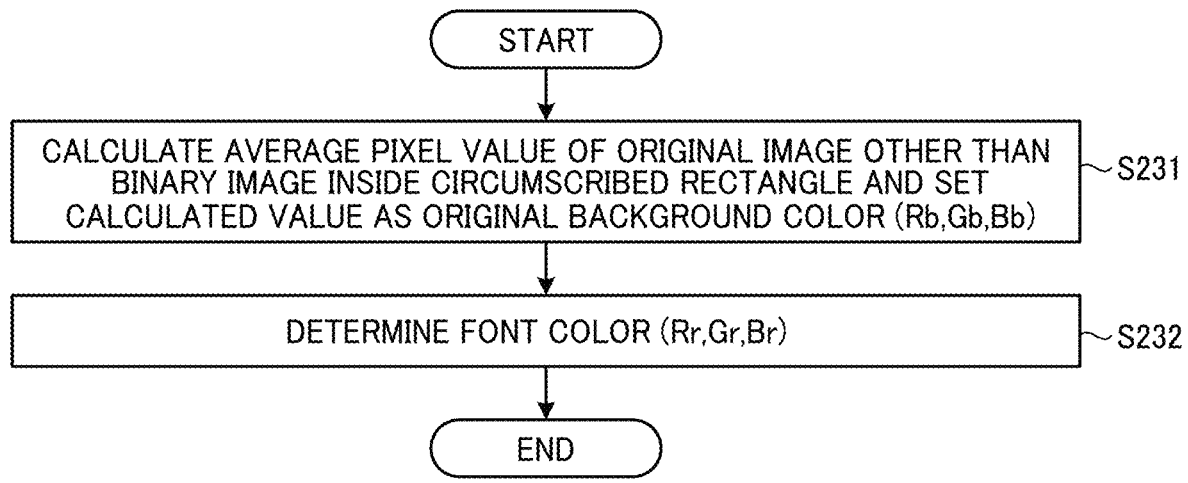
FIG. 11 is a flowchart illustrating an example of the character pixel replacement color determination process performed by the MFP illustrated in FIG. 3.

FIG. 11 is a flowchart illustrating an example of the character pixel replacement color determination process performed by the MFP according to the present embodiment. The details of the character pixel replacement color determination process by the character pixel replacement color determination unit 111 in the MFP 10 will be described with reference to FIG. 11.

In the example illustrated in FIG. 11, the character pixel replacement color determination unit 111 determines the character pixel replacement color based on the determination that the degree of deletion of the character pixel in the original image has a positive correlation with the certainty factor. That is, on the assumption that there is a positive correlation, the color of the character pixel of the original image is replaced with a color closer to the original background color (the degree of deletion of the character pixel is high) as the certainty factor increases, and the color of the character pixel of the original image is replaced with a color farther from the original background color (the degree of deletion of the character pixel tends to be low) as the certainty factor decreases. This method is referred to as positive-correlation deletion method. Further, the character pixel replacement color determination unit 111 calculates the average of the values of the pixels of the original image at positions different from the pixels of the character image inside the circumscribed rectangle cut out by the cutout processing unit 103, thereby obtaining the original background color (Rb,Gb,Bb) based on which the character pixel replacement color (Rr,Gr,Br) is calculated. The suffix r is derived from "replace," and the suffix b is derived from "background." In this case, the character pixel replacement color (Rr,Gr,Br) which is the color (pixel value) of a pixel (replacement character pixel) to be replaced with the pixel of the character image in the original image is calculated and determined based on the original background color (Rb,Gb,Bb) by Equations 3 and 4 below.

When the certainty factor $C \geq Th$, $$Rr=Rb,\ Gr=Gb,\ Br=Bb. \qquad \text{Equation 3}$$

Otherwise, $$Rr=Rb+(255-Rb)\times\{(100-C)/100\}^{0.5}$$

$$Gr=Gb+(255-Gb)\times\{(100-C)/100\}^{0.5}$$

$$Br=Bb+(255-Bb)\times\{(100-C)/100\}^{0.5} \qquad \text{Equation 4}$$

As described above, the certainty factor C takes a value of 0 to 100, and the threshold Th is, for example, 85. The power in Equation 4 is 0.5, but is not limited thereto, and may be, for example, ⅓ to ½ power.

Step S231

The character pixel replacement color determination unit 111 calculates the average of the values of the pixels of the original image at positions different from the pixels of the character image inside the circumscribed rectangle acquired by the font color determination unit 110 in step S221 described above, thereby obtaining the original background color (Rb,Gb,Bb), based on which the character pixel replacement color (Rr,Gr,Br) is calculated. Then, the process proceeds to step S232.

Step S232

The character pixel replacement color determination unit 111 calculates and determines the character pixel replacement color (Rr,Gr,Br) based on the calculated original background color (Rb,Gb,Bb) using Equations 3 and 4 above. Specifically, the character pixel replacement color determination unit 111 sets the second certainty factor acquired by the font color determination unit 110 in step S224 as the certainty factor C, and determines the character pixel replacement color (Rr,Gr,Br) using the above-described Equation 3 when the certainty factor C is equal to or greater than the threshold Th (for example, 85). When the certainty factor C is smaller than the threshold value Th, the character pixel replacement color determination unit 111 calculates and determines the character pixel replacement color (Rr,Gr,Br) using the above-described Equation 4. Then, the character pixel replacement color determination by the character pixel replacement color determination unit 111 ends.

Example of Processing of Cutting Character Image Out of Original Image

Figure 12:
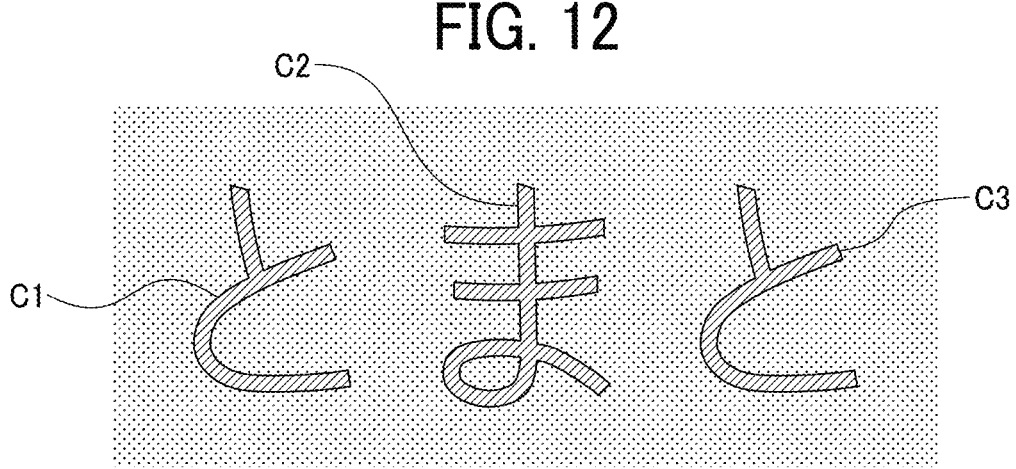
FIG. 12 is a diagram illustrating an example of an original image including characters having a color different from a background color.
Figure 13:
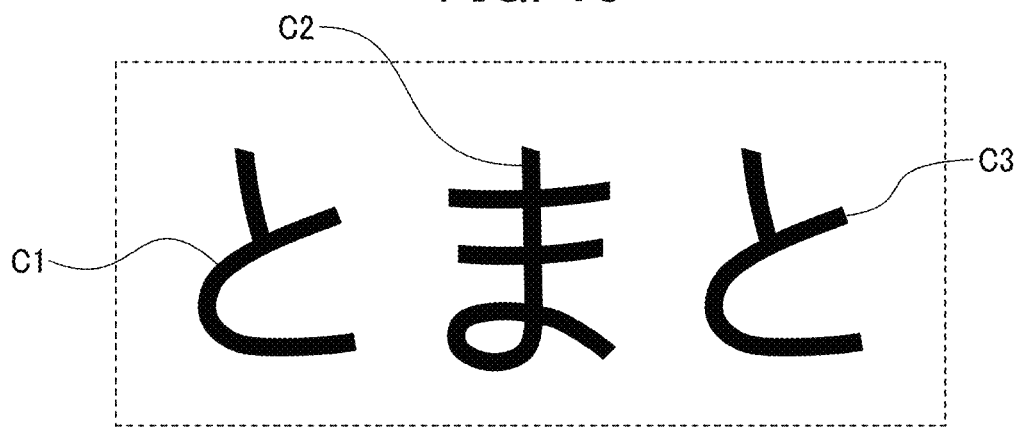
FIG. 13 is an illustration of an example of a binary image.
Figure 14:
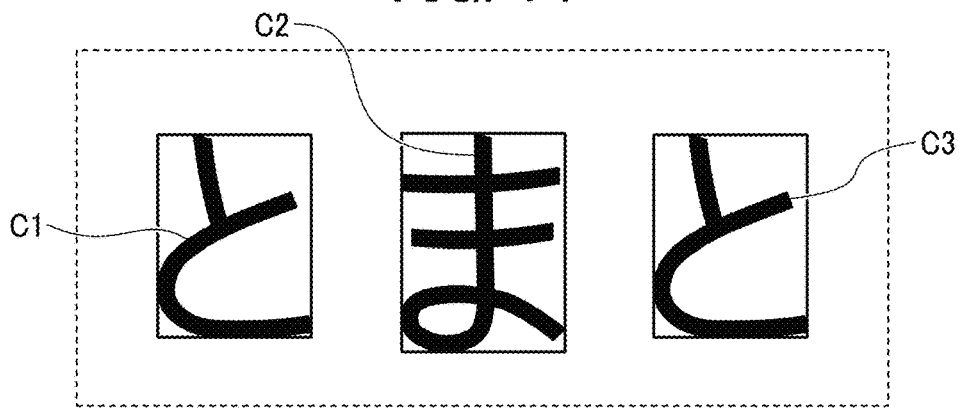
FIG. 14 is a diagram illustrating an example of processing of cutting out a character image from the binary image.

FIG. 12 is a diagram illustrating an example of an original image including characters in a color (e.g., red) different from a color (e.g., orange) of the background. FIG. 13 is an illustration of an example of a binary image. FIG. 14 is a diagram illustrating the cutting-out processing from the binary image. With reference to FIGS. 12 to 14, a description is given of an example of processing of cutting out a character image from an original image, performed by the MFP 10.

The image illustrated in FIG. 12 is an example of an original image of a string of three hiragana characters C1, C2, and C3 in a different color (e.g., red) from the background color (e.g., orange). The image acquisition unit 101 acquires, for example, the original image illustrated in FIG. 12 as image data read by the scanner 532.

Next, the binarization unit 102 binarizes the original image illustrated in FIG. 12 to obtain a binary image illustrated in FIG. 13. Then, as illustrated in FIG. 14, the cutout processing unit 103 cuts out the individual hiragana characters C1, C2, and C3 from the binary image generated by the binarization unit 102 with the circumscribed rectangles thereof.

Example Sequence from Character Recognition Processing to Second Certainty Factor Calculation Processing The Hiragana character images C1, C2 and C3 cut out with the circumscribed rectangles by the cutout processing unit 103 are subjected to the character recognition processing by the character recognition unit 104, the selection processing of the optimum combination (path) of the candidate characters by the combination selection unit 105, and the correction processing of the candidate characters according to a predetermined rule by the rule processing unit 106.

A description is given of an example (pattern 1) in which the first certainty factor calculation unit 107 calculates the first certainty factors as 80%, 85%, and 82% for the candidate characters C1, C2, and C3 that have been subjected to the correction processing by the rule processing unit 106 as presented in Table 1 below.

TABLE 1

| C1 | C2 | C3 |
|----|----|----|
| 80 | 85 | 82 |

When the word dictionary 122 includes a dictionary entry word constructed of the three hiragana characters C1, C2, and C3, the language processing unit 108 calculates the sum (247 in this case) of the first certainty factors of the matching characters because the matching rate between the noun obtained by morphological analysis and the dictionary entry word is 100% (matching: all of three characters), which is greater than 60% calculated by "0.6×k" described above. After comparing the noun with all the entry words in the word dictionary 122, the language processing unit 108 determines the maximum value Smax and replaces the noun with the dictionary entry word corresponding to the maximum value Smax.

Next, the second certainty factor calculation unit 109 calculates the maximum "85" of the respective first certainty factors of the characters C1, C2, and C3 of the noun replaced with the dictionary entry word by the language processing unit 108 as the second certainty factor of each of the characters. The second certainty factor calculation unit 109 assigns the second certainty factor 85% to each of the hiragana characters C1, C2, and C3 as presented in Table 2 below.

TABLE 2

| C1 | C2 | C3 |
|----|----|----|
| 85 | 85 | 85 |

As described above, the characters of the noun have the same second certainty factor. Accordingly, the font visibility and the degree of deletion of the character pixels in the original image are the same in the noun. That is, the font color determination processing and the character pixel replacement color determination processing are executed in a unit of one noun. The result pattern of the first certainty factor (Table 1) and the second certainty factor (Table 2) for each character described above is referred to as pattern 1.

Figure 22:
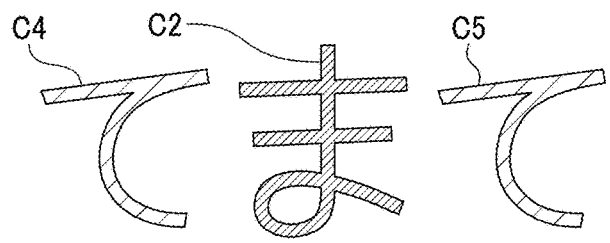
FIG. 22 is a diagram illustrating an example of a font when the certainty factors are not controlled in the unit of one character.

A description is given of an example (pattern 2) in which the first certainty factor calculation unit 107 calculates the first certainty factors as 80%, 85%, and 60% for the candidate characters C1, C2, and C5 (character C5 is illustrated in FIG. 22) that have been subjected to the correction processing by the rule processing unit 106 as presented in Table 3 below.

TABLE 3

| C1 | C2 | C5 |
|----|----|----|
| 80 | 85 | 60 |

When the word dictionary 122 includes a dictionary entry word constructed of the three hiragana characters C1, C2, and C3, the matching rate between the noun obtained by morphological analysis and the dictionary entry word is 67% (matching: two of three characters), which is greater than the threshold 60% calculated by "0.6×k" described above. Then, the language processing unit 108 calculates the sum (225 in this case) of the first certainty factors regarding the characters of the matching dictionary entry word (having the matching rate greater than the threshold). When the maximum value Smax is "225" after comparing the noun with all the dictionary entry words in the word dictionary 122, the language processing unit 108 replaces the noun constructed of the characters C1, C2, and C5 with the dictionary entry word (constructed of the characters C1, C2, and C3) corresponding to the maximum value Smax.

Next, the second certainty factor calculation unit 109 calculates the maximum "85" of the respective first certainty factors of the characters C1, C2, and C3 of the noun replaced with the dictionary entry word by the language processing unit 108 as the second certainty factor of each of the characters. The second certainty factor calculation unit 109 assigns the second certainty factor 85% to each of the hiragana characters C1, C2, and C3 as presented in Table 4 below.

TABLE 4

| C1 | C2 | C3 |
|---|---|---|
| 85 | 85 | 82 |

As described above, the characters of the noun have the same second certainty factor. Accordingly, the font visibility and the degree of deletion of the character pixels in the original image are the same in the noun. That is, the font color determination processing and the character pixel replacement color determination processing are executed in a unit of one noun. The result pattern of the first certainty factor (Table 3) and the second certainty factor (Table 4) for each character described above is referred to as pattern 2.

A description is given of an example (pattern 3) in which the first certainty factor calculation unit 107 calculates the first certainty factors as 35%, 85%, and 40% for the string of candidate characters C4, C2, and C5 (C4 and C5 are illustrated in FIG. 22) that have been subjected to the correction processing by the rule processing unit 106 as presented in Table 5 below.

TABLE 5

| C4 | C2 | C5 |
|---|---|---|
| 35 | 85 | 40 |

Assume that the word dictionary 122 contains the three character word (dictionary entry word) that is the string of the characters C1, C2, and C3 but does not contain a word identical to the string of the characters C4, C2, and C5 obtained by morphological analysis by the language processing unit 108. The matching rate between the string of the characters C4, C2, and C5 and the dictionary entry word is 33% (matching: one of three characters), which is smaller than the threshold 60% calculated by "0.6×k." When the matching rate with other dictionary entry words is equal to or smaller than 60%, the language processing unit 108 determines that there is no dictionary entry word that matches the string of characters C4, C2, and C5, and uses the string of the characters C4, C2, and C5 without character replacement.

When the string of the characters C4, C2, and C5 does not match the dictionary entry word, the second certainty factor calculation unit 109 calculates the minimum "40" of the first certainty factors of the character string as the second certainty factor of each of the characters C4, C2, and C5 in order to impose a penalty, and assigns the second certainty factor 40% to each of the character C4, C2, and C5 as illustrated in Table 6 below.

TABLE 6

| C4 | C2 | C5 |
|---|---|---|
| 40 | 40 | 40 |

As described above, the characters of the noun have the same second certainty factor. Accordingly, the font visibility and the degree of deletion of the character pixels in the original image are the same in the noun. That is, the font color determination and the character pixel replacement color determination are executed in a unit of one noun. The result pattern of the first certainty factor (Table 5) and the second certainty factor (Table 6) for each character described above is referred to as pattern 3.

In the above description, the same value is assigned as the second certainty factor of each character of the noun so that the font color determination and the character pixel replacement color determination are executed in a unit of one noun. Alternatively, the processing can be performed in a unit of one character. In order to perform the processing in the unit of one character, for example, the second certainty factor of a character of the noun that matches a character of a dictionary entry word may be set to the first certainty factor×1.1 (100 at the maximum), and the second certainty factor of a character of the noun that does not match the character of the dictionary entry word may be set to the first certainty factor×0.9. Further, for example, regarding a character of the noun that matches a character of a dictionary entry word, the second certainty factor thereof may be set to the first certainty factor+5 (100 at the maximum), and the second certainty factor of a non-matching character may be set to the first certainty factor−10 (0 at the minimum). Calculating the second certainty factor in this manner can correct an error while maintaining the magnitude relationship of the first certainty factors among the characters in the noun in the second certainty factor.

Figure 15:
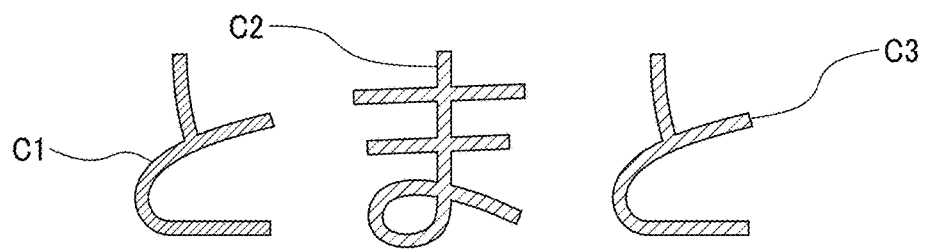
FIG. 15 is a diagram illustrating an example of a font when the certainty factors are not controlled in the unit of one character.
Figure 16:
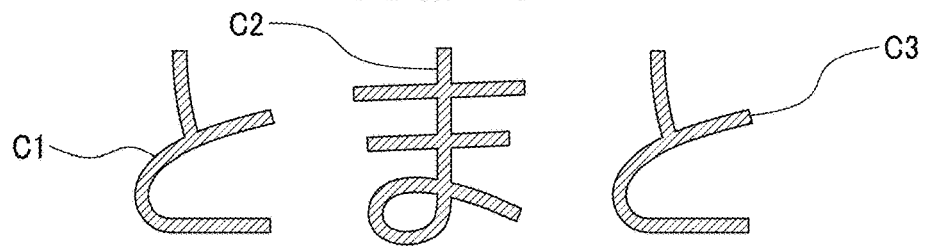
FIG. 16 is a diagram illustrating an example of a font when the certainty factors are controlled in the unit of one character.
Figure 17:
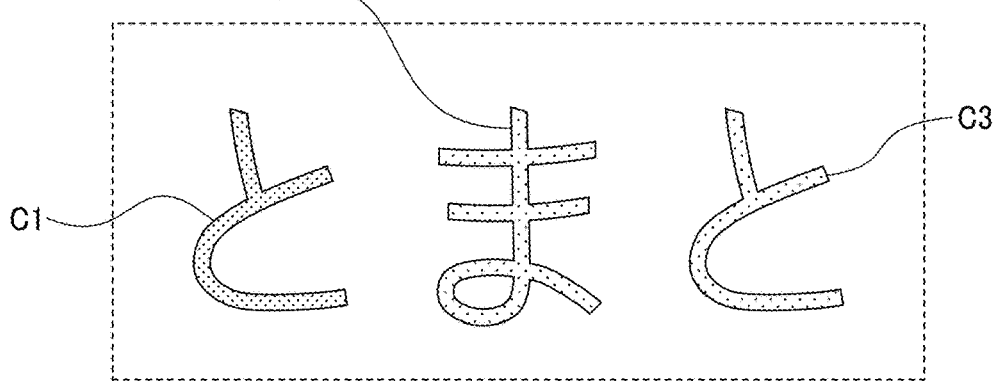
FIG. 17 is a diagram illustrating an example of replacement character pixels when the certainty factors are not controlled in the unit of one character.
Figure 18:
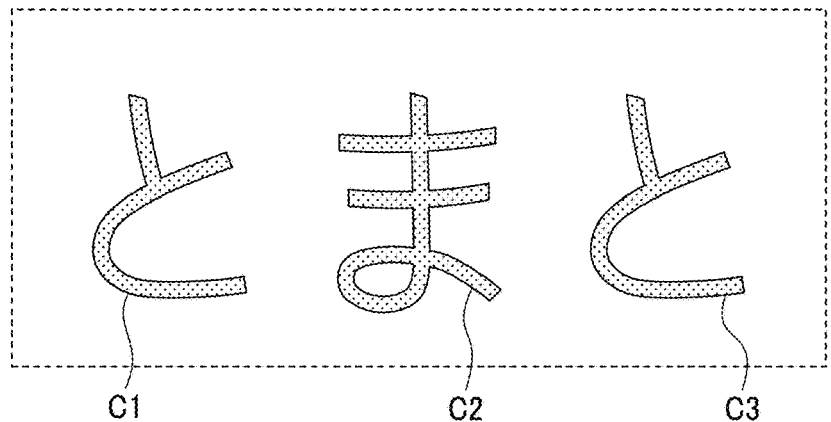
FIG. 18 is a diagram illustrating an example of replacement character pixels when the certainty factors are controlled in the unit of one character.
Figure 19:
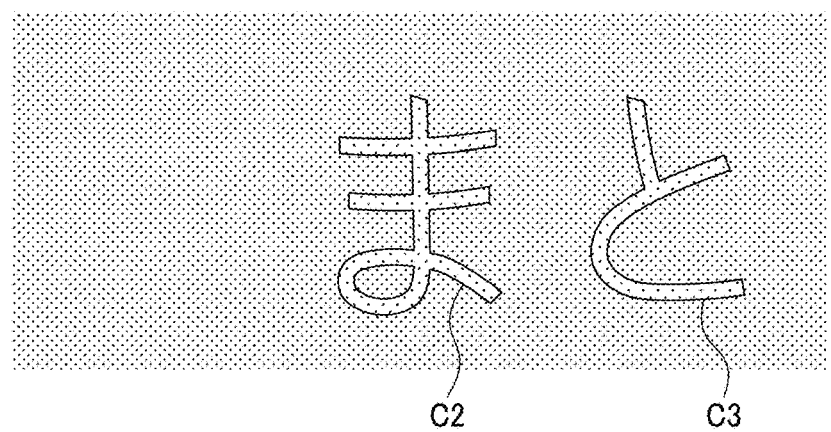
FIG. 19 is a diagram illustrating an example of superimposition of the replacement character pixels when the certainty factors in the original image are not controlled in the unit of one character.
Figure 20:
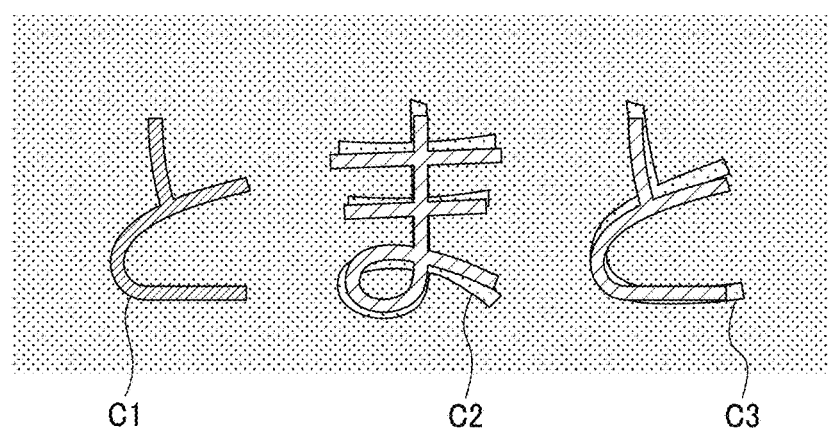
FIG. 20 is a diagram illustrating an example of superimposition of the replacement character pixels and the font when the certainty factors in the original image are not controlled in the unit of one character.
Figure 21:
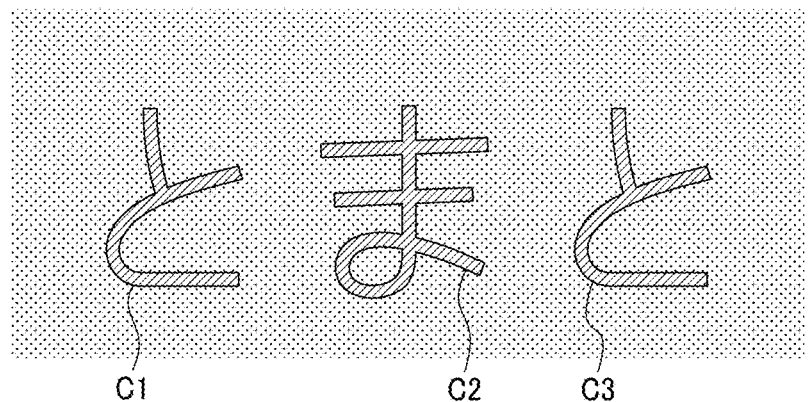
FIG. 21 is a diagram illustrating an example of superimposition, on the original image, of replacement character pixels and the font obtained with the certainty factors controlled in the unit of one character.

Pattern 1: Example of Font Color Determination and Character Pixel Replacement Color Determination Based on Positive Correlation FIG. 15 is an illustration of an example of a font when the certainty factors are not controlled in the unit of one character. FIG. 16 is an illustration of an example of a font when the certainty factors are controlled in the unit of one character. FIG. 17 is an illustration of an example of replacement character pixels when the certainty factors are not controlled in the unit of one character. FIG. 18 is an illustration of an example of replacement character pixels when the certainty factors are controlled in the unit of one character. FIG. 19 is an illustration of an example of superimposing, on the original image, replacement character pixels in which the certainty factors are not controlled in the unit of one character. FIG. 20 is a diagram illustrating an example of superimposing, on the original image, replacement character pixels and a font in which the certainty factors are not controlled in the unit of one character. FIG. 21 is a diagram illustrating an example of superimposing, on the original image, replacement character pixels and a font obtained with the certainty factors controlled in the unit of one character. With reference to FIGS. 15 to 21, a description is given of an example of the font color determination and the character pixel replacement color determination based on the positive correlation in pattern 1.

Table 7 presents the combination of the first certainty factors and the second certainty factor of the three characters C1, C2, and C3 of the noun determined by the language processing unit 108 in pattern 1 described above.

TABLE 7

|  | C1 | C2 | C3 |
| --- | --- | --- | --- |
| First certainty factor | 80 | 85 | 82 |
| Second certainty factor | 85 | 85 | 85 |

The font color determination unit 110 acquires, from the first certainty factor storage area 121, the circumscribed rectangle (coordinates) that is the target of font color determination, and acquires an image portion (that is, a character image) of the binary image corresponding to the coordinates of the circumscribed rectangle and the original image. The font color determination unit 110 calculates the average of the values of the pixels of the original image at the same positions as the pixels of the character image inside the circumscribed rectangle. As a result, the font color determination unit 110 sets the original character color (Rc,Gc,Bc) of the three characters to (250,34,22). The original character color (Rc,Gc,Bc) may be different for each circumscribed rectangle.

In this case, when the first certainty factors in Table 7 are used as the certainty factor C, the font color determination unit 110 calculates the font color (Rf,Gf,Bf) as follows by above-described Equations 1 and 2.

When the certainty factor C is 85, the font color (Rf,Gf,Bf)=(250,34,22).

When the certainty factor C is 80, the font color (Rf,Gf,Bf)=(252,133,126).

When the certainty factor C is 82, the font color (Rf,Gf,Bf)=(252,128,121).

As described above, the font color (Rf,Gf,Bf) calculated using the first certainty factors as the certainty factor C are different from each other. The font and the font color in the case where the font color determination unit 110 determines the font color in the unit of one character are as illustrated in FIG. 15.

By contrast, the font color (Rf,Gf,Bf) calculated using the unified second certainty factor "85" as the certainty factor C is identical. The font and the font color in the case where the font color determination unit 110 determines the font color in the unit of one noun are as illustrated in FIG. 16.

Subsequently, the character pixel replacement color determination unit 111 calculates the average of the values of the pixels of the original image at positions different from the pixels of the character image inside the circumscribed rectangle acquired by the font color determination unit 110 in step S221 described above. As a result, the character pixel replacement color determination unit 111 sets the original background color (Rb,Gb,Bb) of the three circumscribed rectangles to (255,230,153).

In this case, when the first certainty factors in Table 7 are used as the certainty factor C, the character pixel replacement color determination unit 111 calculates the character pixel replacement color (Rr,Gr,Br) as follows by above-described Equations 3 and 4.

When the certainty factor C is 85, the character pixel replacement color (Rr,Gr,Br)=(255,230,153).

When the certainty factor C is 80, the character pixel replacement color (Rr,Gr,Br)=(255,241,199).

When the certainty factor C is 82, the character pixel replacement color (Rr,Gr,Br)=(255,241,196).

As described above, the character pixel replacement color (Rr,Gr,Br) calculated using the first certainty factors as the certainty factor C are different from each other. In the case where the character pixel replacement color determination unit 111 determines the character pixel replacement color in the unit of one character, the replacement character pixels and the character pixel replacement colors are not unified as illustrated in FIG. 17.

By contrast, the character pixel replacement color (Rr,Gr,Br) calculated using the unified second certainty factor "85" as the certainty factor C is identical. In the case where the character pixel replacement color determination unit 111 determines the character pixel replacement color in the unit of one noun, the replacement character pixels and the character pixel replacement color are unified as illustrated in FIG. 18.

Subsequently, in the case where the processing is performed not in the unit of one noun but in the unit of one character, when the wrap processing unit 112 superimposes the replacement character pixels illustrated in FIG. 17 on the original image illustrated in FIG. 12, the result illustrated in FIG. 19 is obtained. Further, when the wrap processing unit 112 superimposes the font illustrated in FIG. 15 on the image illustrated in FIG. 19, the image illustrated in FIG. 20 is obtained.

By contrast, in the case where the processing is performed in the unit of one noun, the wrap processing unit 112 superimposes the replacement character pixels illustrated in FIG. 18 on the original image illustrated in FIG. 12 and further superimposes the font illustrated in FIG. 16 thereon. Then, the result illustrated in FIG. 21 is obtained.

Figure 23:
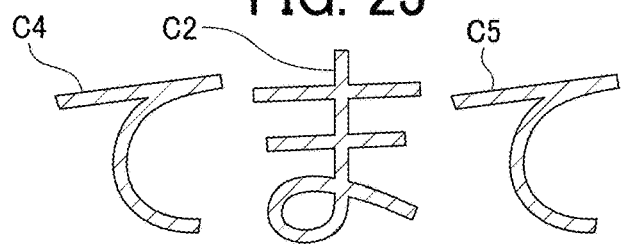
FIG. 23 is a diagram illustrating an example of a font when the certainty factors are controlled in the unit of one character.
Figure 24:
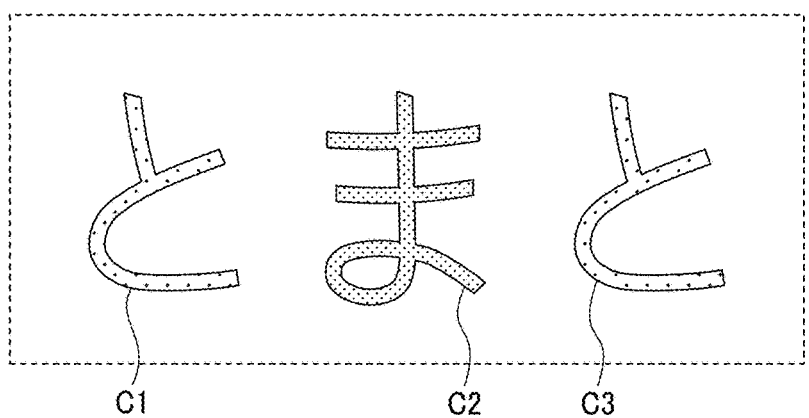
FIG. 24 is a diagram illustrating an example of replacement character pixels when the certainty factors are not controlled in the unit of one character.
Figure 25:
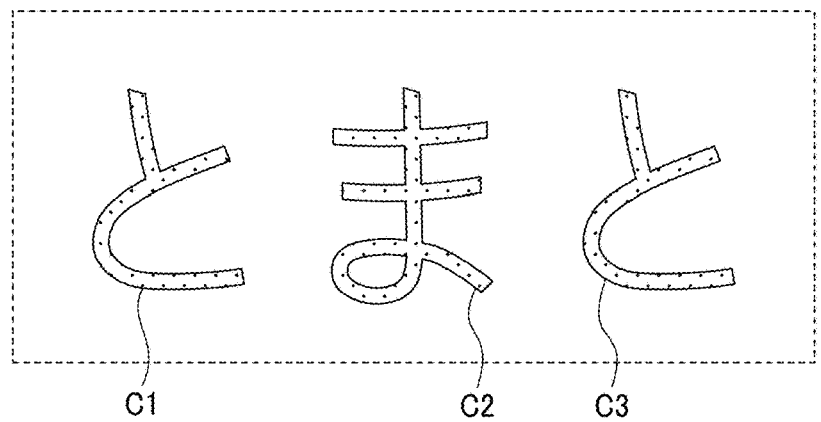
FIG. 25 is a diagram illustrating an example of replacement character pixels when the certainty factors are controlled in the unit of one character.
Figure 26:
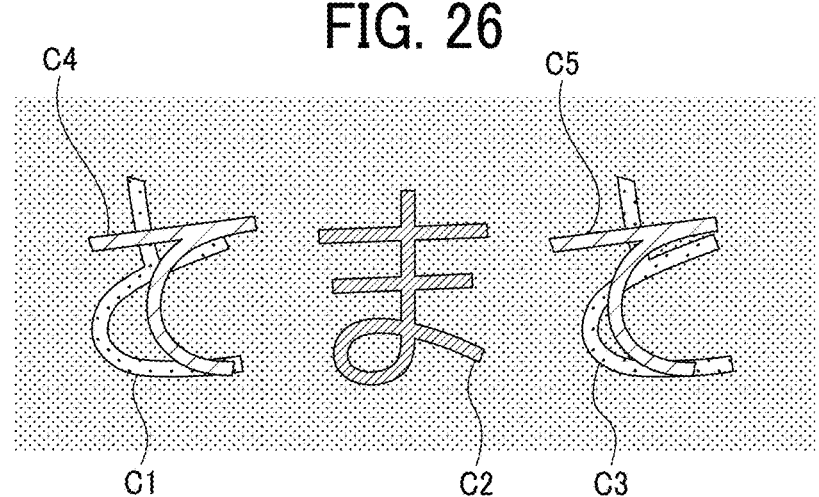
FIG. 26 is a diagram illustrating an example of superimposition of the replacement character pixels and the font when the certainty factors in the original image are not controlled in the unit of one character.
Figure 27:
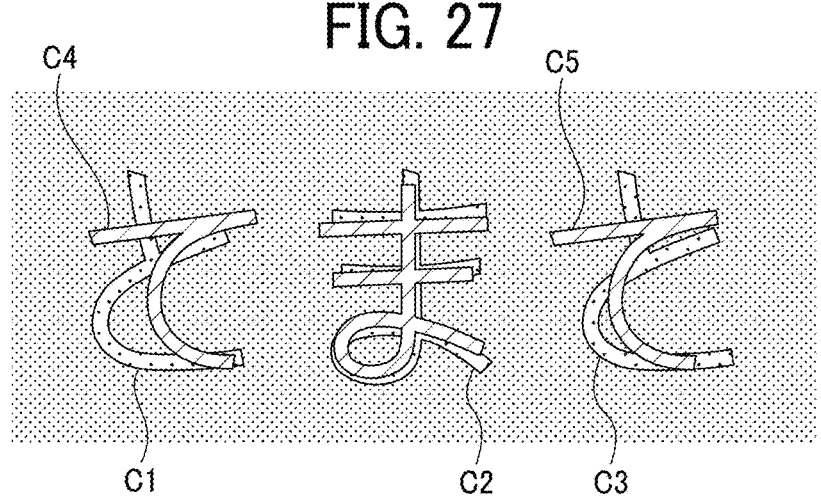
FIG. 27 is a diagram illustrating an example of superimposition, on the original image, of replacement character pixels and the font obtained with the certainty factors controlled in the unit of one character.

Pattern 3: Example of Font Color Determination and Character Pixel Replacement Color Determination Based on Positive Correlation FIG. 22 is an illustration of an example of a font when the certainty factors are not controlled in the unit of one character. FIG. 23 is an illustration of an example of a font when the certainty factors are controlled in the unit of one character. FIG. 24 is an illustration of an example of replacement character pixels when the certainty factors are not controlled in the unit of one character. FIG. 25 is an illustration of an example of replacement character pixels when the certainty factors are controlled in the unit of one character. FIG. 26 is an illustration of an example of superimposition of replacement character pixels and font when the certainty factors in the original image are not controlled in the unit of one character. FIG. 27 is an illustration of an example of superimposition, on the original image, of replacement character pixels and font obtained with the certainty factors controlled in the unit of one character. With reference to FIGS. 22 to 27, a description is given of an example of the font color determination and the character pixel replacement color determination based on the positive correlation in pattern 3.

Table 8 presents the combination of the first certainty factors and the second certainty factor of the three characters C4, C2, and C5 of the noun determined by the language processing unit 108 in pattern 3 described above.

TABLE 8

|  | C4 | C2 | C5 |
| --- | --- | --- | --- |
| First certainty factor | 30 | 85 | 40 |
| Second certainty factor | 40 | 40 | 40 |

The font color determination unit 110 acquires, from the first certainty factor storage area 121, the circumscribed rectangle (coordinates) that is the target of font color determination, and acquires an image portion (that is, a character image) of the binary image corresponding to the coordinates of the circumscribed rectangle and the original image. The font color determination unit 110 calculates the average of the values of the pixels of the original image at the same positions as the pixels of the character image inside the circumscribed rectangle. As a result, the font color determination unit 110 sets the original character color (Rc,Gc,Bc) of the three characters to (250,34,22). The original character color (Rc,Gc,Bc) may be different for each circumscribed rectangle.

In this case, when the first certainty factors in Table 8 are used as the certainty factor C, the font color determination unit 110 calculates the font color (Rf,Gf,Bf) as follows by above-described Equations 1 and 2.

When the certainty factor C is 35, the font color (Rf,Gf,Bf)=(254,212,210).

When the certainty factor C is 85, the font color (Rf,Gf,Bf)=(250,34,22).

When the certainty factor C is 40, the font color (Rf,Gf,Bf)=(252,205,202).

As described above, the font color (Rf,Gf,Bf) calculated using the first certainty factors as the certainty factor C are different from each other. The font and the font color in the case where the font color determination unit 110 determines the font color in the unit of one character are as illustrated in FIG. 22.

By contrast, the font color (Rf,Gf,Bf) calculated using the unified second certainty factor "40" as the certainty factor C is identical. The font and the font color in the case where the font color determination unit 110 determines the font color in the unit of one noun are as illustrated in FIG. 23.

Subsequently, the character pixel replacement color determination unit 111 calculates the average of the values of the pixels of the original image at positions different from the pixels of the character image inside the circumscribed rectangle acquired by the font color determination unit 110 in step S221 described above. As a result, the character pixel replacement color determination unit 111 sets the original background color (Rb,Gb,Bb) of the three circumscribed rectangles to (255,230,153).

In this case, when the first certainty factors in Table 8 are used as the certainty factor C, the character pixel replacement color determination unit 111 calculates the character pixel replacement color (Rr,Gr,Br) as follows by above-described Equations 3 and 4.

When the certainty factor C is 35, the character pixel replacement color (Rr,Gr,Br)=(255,250,235).

When the certainty factor C is 85, the character pixel replacement color (Rr,Gr,Br)=(255,230,153).

When the certainty factor C is 40, the character pixel replacement color (Rr,Gr,Br)=(255,249,232).

As described above, the character pixel replacement color (Rr,Gr,Br) calculated using the first certainty factors as the certainty factor C are different from each other. In the case where the character pixel replacement color determination unit 111 determines the character pixel replacement color in the unit of one character, the replacement character pixels and the character pixel replacement colors are not unified as illustrated in FIG. 24.

By contrast, the character pixel replacement color (Rr,Gr,Br) calculated using the unified second certainty factor "40" as the certainty factor C is identical. In the case where the character pixel replacement color determination unit 111 determines the character pixel replacement color in the unit of one noun, the replacement character pixels and the character pixel replacement color are unified as illustrated in FIG. 25.

Subsequently, in the case where the processing is performed not in the unit of one noun but in the unit of one character, the wrap processing unit 112 superimposes the replacement character pixels illustrated in FIG. 24 on the original image illustrated in FIG. 12 and further superimposes the font illustrated in FIG. 22 thereon. The, the result illustrated in FIG. 26 is obtained.

By contrast, in the case where the processing is performed in the unit of one noun, the wrap processing unit 112 superimposes the replacement character pixels illustrated in FIG. on the original image illustrated in FIG. 12 and further superimposes the font illustrated in FIG. 23 thereon. Then, the result illustrated in FIG. 27 is obtained.

As described above, when determining that the font visibility has a positive correlation with the certainty factor, the MFP 10 considers the attention calling to be important as the certainty factor increases, and makes the font color darker to be noticeable. The MFP 10 considers the attention calling to be unimportant as the certainty factor decreases, and makes the font color lighter so as not to be noticeable. Further, on the assumption that the degree of deletion of character pixels in the original image has a positive correlation with the certainty factor, as the certainty factor increases, the MFP 10 replaces the color of the character pixel of the original image with a color closer to the original background color (the degree of deletion of character pixels is high such that the character is unrecognizable). By contrast, as the certainty factor decreases, the MFP 10 replaces the color of the character pixel of the original image with a color farther from the original background color (the degree of deletion of the character pixel is low such that the character is recognizable).

Figure 28:
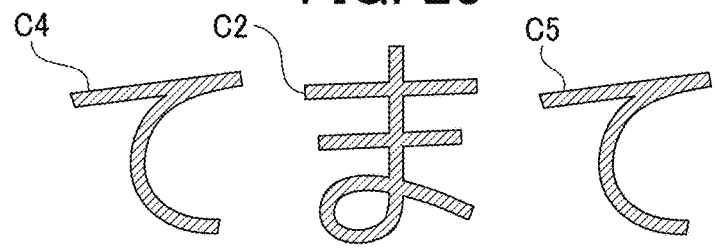
FIG. 28 is a diagram illustrating an example of a font when the certainty factors are controlled in the unit of one character based on a negative correlation.
Figure 29:
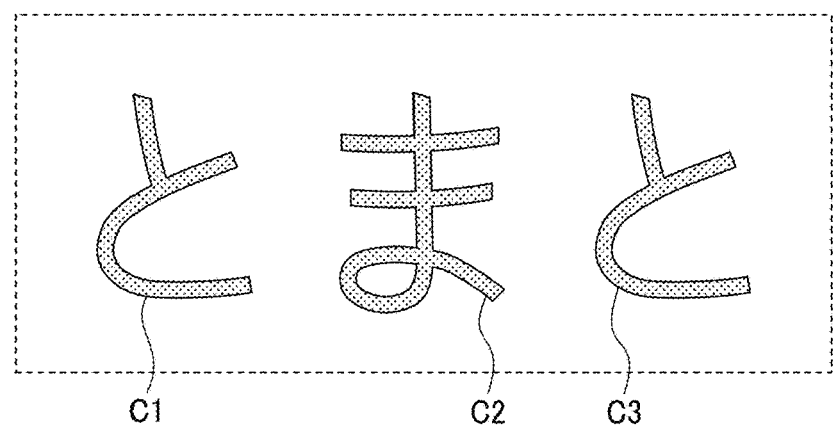
FIG. 29 is a diagram illustrating an example of replacement character pixels when the certainty factors are controlled in the unit of one character based on the negative correlation.
Figure 30:
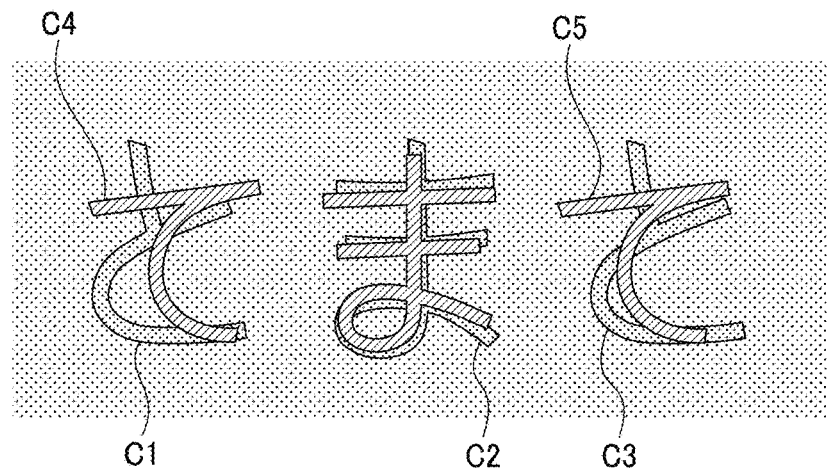
FIG. 30 is a diagram illustrating an example of superimposition, on the original image, of replacement character pixels and the font obtained with the certainty factors controlled in the unit of one character based on the negative correlation.
Figure 31:
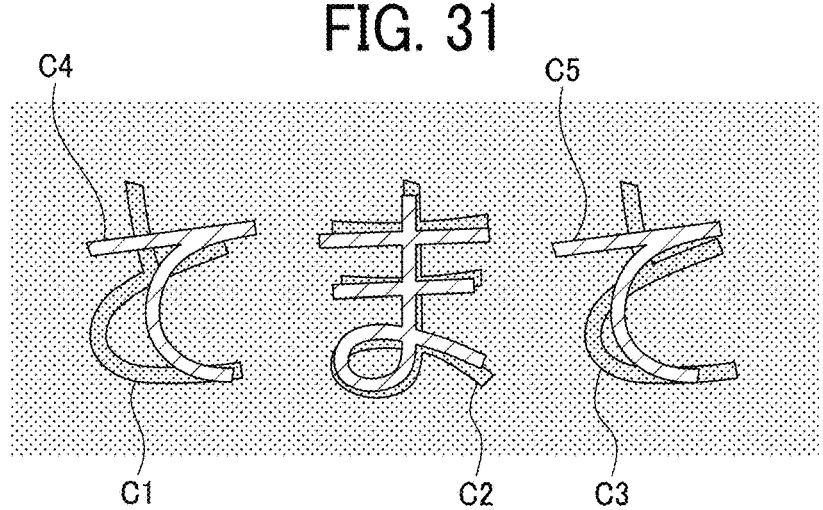
FIG. 31 is a diagram illustrating an example of superimposition, on the original image, of replacement character pixels obtained with the certainty factors controlled in the unit of one character based on the negative correlation and the font obtained with the certainty factors controlled in the unit of one character based on the positive correlation.

Pattern 3: Example of Font Color Determination and Character Pixel Replacement Color Determination Based on Negative Correlation FIG. 28 is an illustration of an example of a font when the certainty factors are controlled in the unit of one character based on a negative correlation. FIG. 29 is an illustration of an example of replacement character pixels when the certainty factors are controlled in the unit of one character based on the negative correlation. FIG. 30 is an illustration of an example of superimposing, on the original image, replacement character pixels and the font obtained with the certainty factors controlled in the unit of one character based on the negative correlation. FIG. 31 is an illustration of an example of superimposing, on the original image, replacement character pixels obtained with the certainty factors controlled in the unit of one character based on the negative correlation and the font obtained with the certainty factors controlled in the unit of one character based on the positive correlation. With reference to FIGS. 28 to 31, a description is given of an example of the font color determination and the character pixel replacement color determination based on the negative correlation in pattern 3. The font color determination unit 110 determines the font color based on the determination that the font visibility has a negative correlation with the certainty factor. That is, on the assumption that there is a negative correlation, attention calling is considered to be less important as the certainty factor increases, and the font color is set to be lighter. By contrast, attention calling is considered to be important as the certainty factor decreases, and the font color is set to be darker. This method is referred to as negative-correlation visibility method. Further, the character pixel replacement color determination unit 111 determines the character pixel replacement color based on the determination that the degree of deletion of the character pixel in the original image has the negative correlation with the certainty factor. That is, on the assumption that there is the negative correlation, the color of the character pixel of the original image is replaced with a color farther from the original background color (the degree of deletion of the character pixel is low) as the certainty factor increases, and the color of the character pixel of the original image is replaced with a color closer from the original background color (the degree of deletion of the character pixel is high) as the certainty factor decreases. This method is referred to as negative-correlation deletion method.

In this case, the font color (Rf,Gf,Bf) of the noun (font) that has been subjected to the language processing by the language processing unit 108 is calculated and determined based on the original character color (Rc,Gc,Bc) by Equations 5 and 6 below.

When the certainty factor C≥Th, $$Rf=Rc,\ Gf=Gc,\ Bf=Bc. \quad \text{Equation 5}$$

Otherwise, $$Rf=Rc-Rc\times\{(100-C)/100\}^{0.5}$$

$$Gf=Gc-Gc\times\{(100-C)/100\}^{0.5}$$

$$Bf=Bc-Bc\times\{(100-C)/100\}^{0.5} \quad \text{Equation 6}$$

The certainty factor C has a value of 0 to 100, and the threshold Th is, for example, 85. The power in Equation 6 is 0.5, but is not limited thereto, and may be, for example, ⅓ to ½ power.

In this case, the character pixel replacement color (Rr,Gr, Br) which is the color (pixel value) of a pixel (replacement character pixel) to be replaced with the pixel of the character portion in the original image is calculated and determined based on the original background color (Rb,Gb,Bb) by Equations 7 and 8 below.

When the certainty factor C≥Th, $$Rr=Rb,\ Gr=Gb,\ Br=Bb. \quad \text{Equation 7}$$

Otherwise, $$Rr=Rb-Rb\times\{(100-C)/100\}^{0.5}$$

$$Gr=Gb-Gb\times\{(100-C)/100\}^{0.5}$$

$$Br=Bb-Bb\times\{(100-C)/100\}^{0.5} \quad \text{Equation 8}$$

As described above, the certainty factor C takes a value of 0 to 100, and the threshold Th is, for example, 85. The power in Equation 8 is 0.5, but is not limited thereto, and may be, for example, ⅓ to ½ power.

The combination of the first certainty factors and the second certainty factor of the three characters C4, C2, and C5 of the noun determined by the language processing unit 108 is pattern 3 described above, that is, presented in Table 8.

The font color determination unit 110 acquires, from the first certainty factor storage area 121, the circumscribed rectangle (coordinates) that is the target of font color determination, and acquires an image portion (that is, a character image) of the binary image corresponding to the coordinates of the circumscribed rectangle and the original image. The font color determination unit 110 calculates the average of the values of the pixels of the original image at the same positions as the pixels of the character image inside the circumscribed rectangle. As a result, the font color determination unit 110 sets the original character color (Rc,Gc,Bc) of the three characters to (250,34,22). The original character color (Rc,Gc,Bc) may be different for each circumscribed rectangle.

In this case, when the unified second certainty factors "40" in Table 8 is used as the certainty factor C, the font color determination unit 110 calculates the font color (Rf, Gf,Bf) as follows by above-described Equations 5 and 6.

When the certainty factor C is 40, the font color (Rf,Gf, Bf)=(250,8,5).

The font color (Rf,Gf,Bf) thus calculated using the unified second certainty factor "40" as the certainty factor C is identical. The font and the font color in the case where the font color determination unit 110 determines the font color in the unit of one noun are unified as illustrated in FIG. 28.

Subsequently, the character pixel replacement color determination unit 111 calculates the average of the values of the pixels of the original image at positions different from the pixels of the character image inside the circumscribed rectangle acquired by the font color determination unit 110 in step S221 described above. As a result, the character pixel replacement color determination unit 111 sets the original background color (Rb,Gb,Bb) of the three circumscribed rectangles to (255,230,153).

In this case, when the unified second certainty factor "40" in Table 8 is used as the certainty factor C, the character pixel replacement color determination unit 111 calculates the character pixel replacement color (Rr,Gr,Br) as follows by above-described Equations 7 and 8.

When the certainty factor C is 40, the character pixel replacement color (Rr,Gr,Br)=(255,52,35).

In this way, the character pixel replacement color (Rr,Gr, Br) calculated using the unified second certainty factor "40" as the certainty factor C is identical. In the case where the character pixel replacement color determination unit 111 determines the character pixel replacement color in the unit of one noun, the replacement character pixels and the character pixel replacement color are unified as illustrated in FIG. 29.

Subsequently, in the case where the processing is performed not in the unit of one noun but in the unit of one character, the wrap processing unit 112 superimposes the replacement character pixels illustrated in FIG. 24 on the original image illustrated in FIG. 12 and further superimposes the font illustrated in FIG. 22 thereon. Then, the result illustrated in FIG. 26 is obtained.

Subsequently, in the case where the processing is performed in the unit of one noun, the wrap processing unit 112 superimposes the replacement character pixels illustrated in FIG. 29 on the original image illustrated in FIG. 12 and further superimposes the font illustrated in FIG. 28 thereon. Then, the result illustrated in FIG. 30 is obtained.

As described above, based on the determination that the font visibility has a negative correlation with the certainty factor, the attention calling is considered to be less important as the certainty factor increases, and the color is made lighter. By contrast, the attention calling is considered to be important as the certainty factor decreases, and the color is made darker. That is, based on the determination that the degree of deletion of character pixels in the original image has a negative correlation with the certainty factor, the color of the character pixel of the original image is replaced with a color farther from the original background color (the degree of deletion of the character pixel is low) as the certainty factor increases, and the color of the character pixel of the original image is replaced with a color closer to the original background color (the degree of deletion of the character pixel is high) as the certainty factor decreases.

FIG. 30 illustrates the result of the font color determination and the character pixel replacement color determination based on the negative correlation, but these processing can be independent of each other. The processing may be performed by setting positive correlation or negative correlation separately for each processing with the same processing conditions (original image and character certainty factor). FIG. 31 illustrates the result of, for example, the font color determination processing based on the positive correlation and the character pixel replacement color determination processing based on the negative correlation. Specifically, the wrap processing unit 112 superimposes, on the original image (illustrated in FIG. 12), the replacement character pixels (illustrated in FIG. 29) subjected to the character pixel replacement color determination processing and the font (illustrated in FIG. 23) subjected to the font color determination processing.

Further, in the font color determination processing and the character pixel replacement color determination processing, not limited to a positive correlation or a negative correlation, the correlation may be freely set such that there is no correlation with the certainty factor. For example, the certainty factor has a positive correlation from a particular certainty factor to a particular certainty factor and a negative correlation at other certainty factors. As a result, the variation of the visual attention calling is increased, and the document data can be output in an easy-to-see, convenient, and natural manner to a reader.

Figure 32:
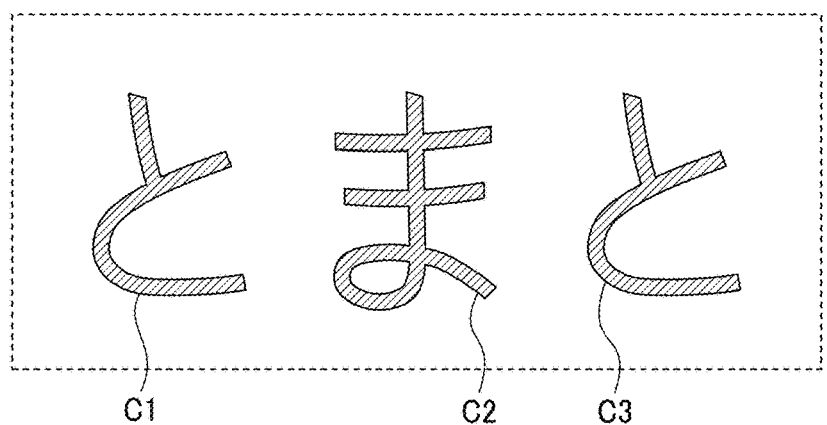
FIG. 32 is a diagram illustrating an example of an original image including red characters on a white background.
Figure 33:
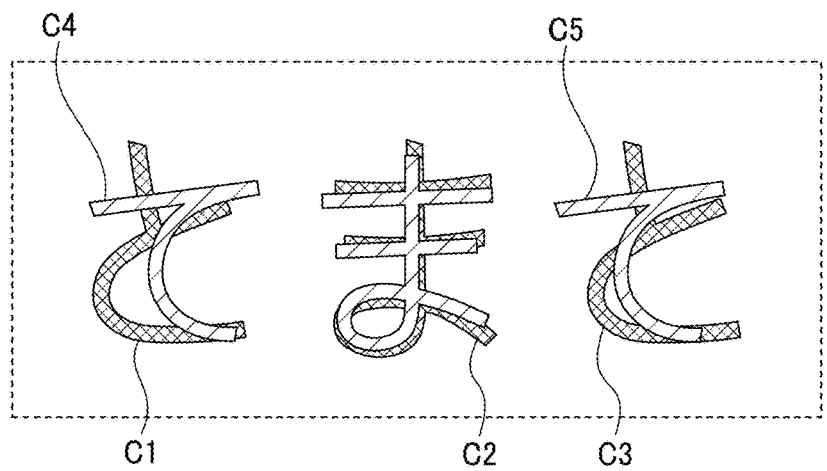
FIG. 33 is a diagram illustrating an example of superimposition, on the original image, of replacement character pixels obtained with the certainty factors controlled in the unit of one character based on the negative correlation and the font obtained with the certainty factors controlled in the unit of one character based on the positive correlation.

Pattern 3: Example of Font Color Determination and Character Pixel Replacement Color Determination for White Background Image FIG. 32 is an illustration of an example of an original image including characters in a different color (e.g., red) on a white background. FIG. 33 is an illustration of an example of superimposing, on the original image, replacement character pixels obtained with the certainty factors controlled in the unit of one character based on the negative correlation and the font obtained with the certainty factors controlled in the unit of one character based on the positive correlation. With reference to FIGS. 32 and 33, a description is given of an example of the font color determination processing and the character pixel replacement color determination processing for an original image having a white background in pattern 3.

In the case where the original background color is white, that is, when the original background color (Rb,Gb,Bb) is (255,255,255), the character pixel replacement color (Rr,Gr,Br) calculated by the above-described Equations 3 and 4 is also (255,255,255) regardless of the certainty factor C. There is not effect of calling attention. In this case, it is necessary to consider the relationship between the original character color (Rc,Gc,Bc) and the original background color (Rb,Gb,Bb) in the font color determination and the character pixel replacement color determination.

When the above Equations 7 and 8 are applied to the case of an original background color that is other than white and has the maximum value as any of R, G, and B values, the original character color is maintained. When the above Equations 7 and 8 are applied to the case of white background, white is not replaced due to the limitation. Accordingly, the character pixel replacement color is determined without the limitation only when the original background color (Rb,Gb,Bb) is (255,255,255). Then, an effect of calling attention can be expected.

For example, as illustrated in FIG. 32, it is assumed that the original image includes a white background and the characters C1, C2, and C3 in red, but the language processing unit 108 determines the noun that is a string of characters C4, C2, and C5. The combination of the first certainty factors and the second certainty factor of the three characters C4, C2, and C5 is pattern 3 described above, that is, presented in Table 8.

The font color determination unit 110 acquires, from the first certainty factor storage area 121, the circumscribed rectangle (coordinates) that is the target of font color determination, and acquires an image portion (that is, a character image) of the binary image corresponding to the coordinates of the circumscribed rectangle and the original image. The font color determination unit 110 calculates the average of the values of the pixels of the original image at the same positions as the pixels of the character image inside the circumscribed rectangle. As a result, the font color determination unit 110 sets the original character color (Rc,Gc,Bc) of the three characters to (250,34,22).

In this case, when the unified second certainty factors "40" in Table 8 is used as the certainty factor C, the font color determination unit 110 calculates the font color (Rf, Gf,Bf) as follows by above-described Equations 1 and 2 based on the positive correlation.

When the certainty factor C is 40, the font color (Rf,Gf, Bf)=(254,205,202).

The font and the font color determined in the unit of one noun by the font color determination unit 110 based on the positive correlation are unified as illustrated in FIG. 23.

Subsequently, when the unified second certainty factor "40" in Table 8 is used as the certainty factor C and the character pixel replacement color determination unit 111 uniformly darkens the pixels toward black (based on the negative correlation), the character pixel replacement color (Rr,Gr,Br) is calculated by above-described Equations 7 and 8 as follows.

When the certainty factor C is 40, the character pixel replacement color (Rr,Gr,Br)=(58,58,58).

Subsequently, the wrap processing unit 112 superimposes, on the original image illustrated in FIG. 32, the replacement character pixels having the character pixel replacement color (Rr,Gr,Br) determined by the above-described character pixel replacement color determination process, and further superimposes the font illustrated in FIG. 23 thereon. The result is illustrated in FIG. 33.

In the description above, the character pixel replacement color is darkened toward black in the character pixel replacement color determination of the original image having a white background. However, the processing is not limited thereto. For example, any one or two components of the original background colors (Rb,Gb,Bb) may be kept at "255" with the other components replaced. Then, the color can be darkened with the primary color or the secondary color. For example, the character pixel replacement color (Rr,Gr,Br) is calculated and determined by the following Equations 9 and 10 derived from the above-described Equations 7 and 8.

When the certainty factor C≥Th, $Rr=255, Gr=255, Br=255$ \hfill Equation 9

Otherwise, $Rr=255-255\times\{(100-C)/100\}^{0.5}$ $Gr=255-255\times\{(100-C)/100\}^{0.5}$ $Br=255$ \hfill Equation 10

As a result, the character pixel replacement color can be made darker to blue by the character pixel replacement color determination process for the original image having a white background.

Example of Font Color Determination and Character Pixel Replacement Color Determination Using Complementary Colors of Original Character Color and Original Background Color Next, a description will be given of setting the font color and the character pixel replacement color to colors completely different from the original character color and the original background color, so as to perform attention calling more effectively.

For example, the font color determination unit 110 calculates and determines the font color (Rf,Gf,Bf) of the noun (font), which is obtained by the language processing by the language processing unit 108, based on the complementary color (Rcc,Gcc,Bcc) (first complementary color) of the original character color (Rc,Gc,Bc) by the following Equations 11 to 13. The second suffix c is derived from "complementary"

When the certainty factor C≥Th, $$Rf=Rcc,\ Gf=Gcc,\ Bf=Bcc \qquad \text{Equation 11}$$

(Otherwise: darkening the color as the certainty factor C decreases)

$$Rf=Rcc+255\times(C/100)^{0.5}$$

$$Gf=Gcc+255\times(C/100)^{0.5}$$

$$Bf=Bcc+255\times(C/100)^{0.5} \qquad \text{Equation 12}$$

(Otherwise: making the color lighter as the certainty factor C decreases)

$$Rf=Rcc+255\times\{(100-C)/100\}^{0.5}$$

$$Gf=Gcc+255\times\{(100-C)/100\}^{0.5}$$

$$Bf=Bcc+255\times\{(100-C)/100\}^{0.5} \qquad \text{Equation 13}$$

The certainty factor C has a value of 0 to 100, and the threshold Th is, for example, 85. The power in Equations 12 and 13 is 0.5, but is not limited thereto, and may be, for example, ⅓ to ½ power.

Similarly, the character pixel replacement color (Rr,Gr,Br) which is the color (pixel value) of a pixel (replacement character pixel) to be replaced with the pixel of the character image in the original image is calculated and determined based on the complementary color (Rcc,Gcc,Bcc) (second complementary color) of the original background color (Rb,Gb,Bb) by Equations 14 to 16 below. The second suffix c is derived from "complementary."

When the certainty factor C≥Th, $$Rr=Rbc,\ Gr=Gbc,\ Br=Bbc \qquad \text{Equation 14}$$

(Otherwise: darkening the color as the certainty factor C decreases)

$$Rr=Rbc+255\times(C/100)^{0.5}$$

$$Gr=Gbc+255\times(C/100)^{0.5}$$

$$Br=Bbc+255\times(C/100)^{0.5} \qquad \text{Equation 15}$$

(Otherwise: making the color lighter as the certainty factor C decreases)

$$Rr=Rbc+255\times\{(100-C)/100\}^{0.5}$$

$$Gr=Gbc+255\times\{(100-C)/100\}^{0.5}$$

$$Br=Bbc+255\times\{(100-C)/100\}^{0.5} \qquad \text{Equation 16}$$

The certainty factor C has a value of 0 to 100, and the threshold Th is, for example, 85. The power in Equations 15 and 16 is 0.5, but is not limited thereto, and may be, for example, ⅓ to ½ power.

By executing the font color determination process and the character pixel replacement color determination process based on the complementary colors of the original character color and the original background color, calling attention can be made more effectively.

In the above description, the font color is determined using the complementary color of the original character color, and the character pixel replacement color is determined using the complementary color of the original background color, but determination of the colors is not limited thereto. For example, the font color may be determined using the complementary color of the original background color, and the character pixel replacement color may be determined using the complementary color of the original character color. Such a configuration can increase variations in visibility and attention calling.

Figure 34:
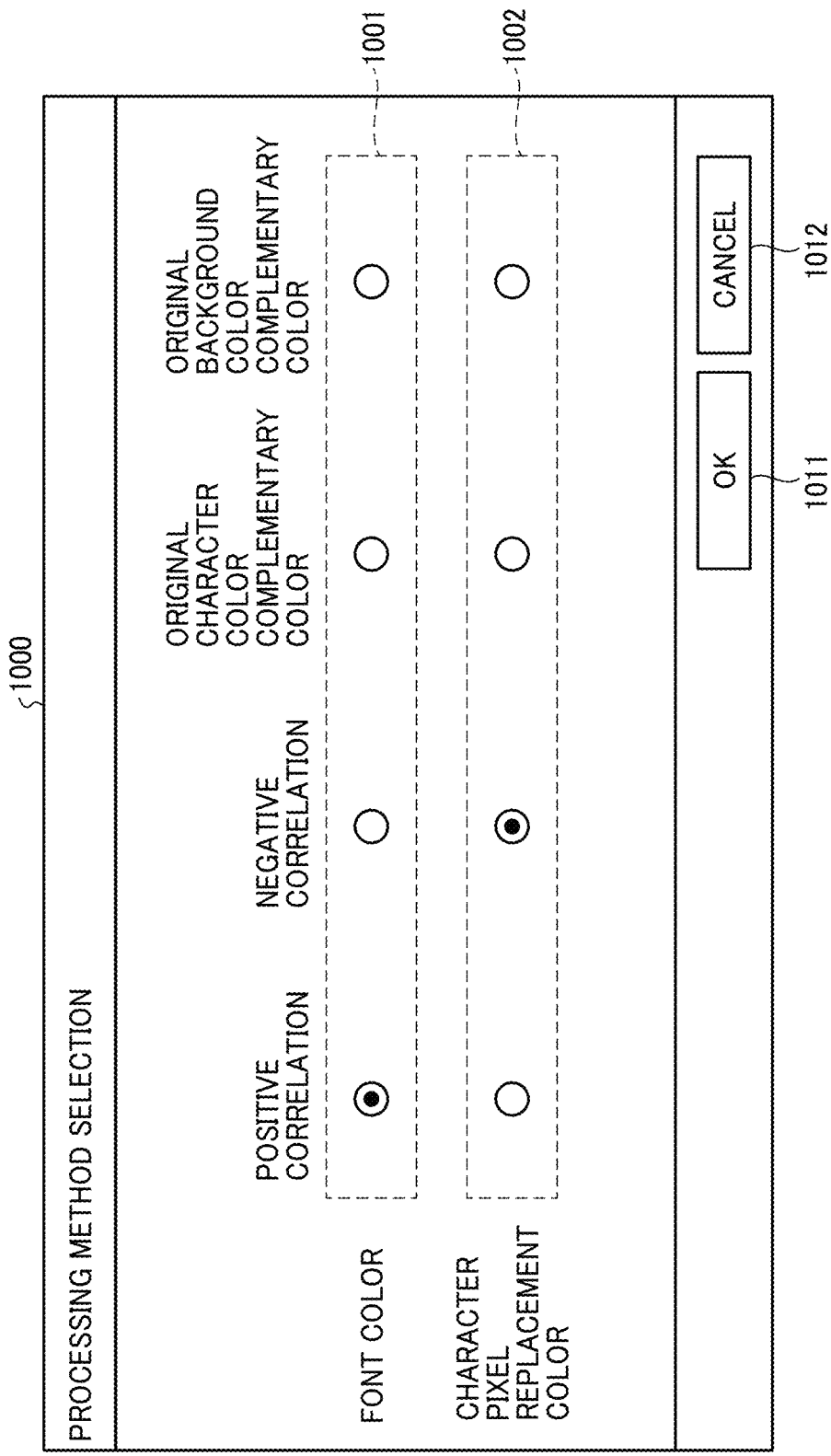
FIG. 34 is a diagram illustrating an example of a processing method selection screen.

Selection of Method for Font Color Determination and Character Pixel Replacement Color Determination FIG. 34 is a diagram illustrating an example of a processing method selection screen. With reference to FIG. 34, a description is given of selecting and setting the processing method for the font color determination and the character pixel replacement color determination.

In the described above, the font color and the character pixel replacement color are determined in the processing method based on one of the positive correlation with the certainty factor, the negative correlation with the certainty factor, the complementary color of the original character color, and the complementary color of the original background color. In one embodiment, these methods can be freely selected. FIG. 34 illustrates a processing method selection screen 1000 FIG. 34 that is displayed on the control panel 510 under the control of the display control unit 132. The processing method selection screen 1000 is a screen for selecting and setting the processing method for determining the font color and the character pixel replacement color. As illustrated in FIG. 34, the processing method selection screen 1000 includes a selection field 1001 for font color determination processing method, a selection field 1002 for character pixel replacement color determination processing method, an OK button 1011, and a cancel button 1012.

The selection field 1001 includes radio buttons for selecting the processing method (first processing method) used in the font color determination by the font color determination unit 110 from the method based on the positive correlation with respect to the certainty factor (the first certainty factor or the second certainty factor), the method based on the negative correlation with respect to the certainty factor, the method based on the complementary color of the original character color, and the method based on the complementary color of the original background color.

The selection field 1002 includes radio buttons for selecting the processing method (second processing method) used in the character pixel replacement color determination by the character pixel replacement color determination unit 111 from the method based on the positive correlation with respect to the certainty factor (the first certainty factor or the second certainty factor), the method based on the negative correlation with respect to the certainty factor, the method based on the complementary color of the original character color, and the method based on the complementary color of the original background color.

The OK button 1011 is a button for confirming the setting content of the processing method selected by the radio button in each of the selection field 1001 for font color and the selection field 1002 for character pixel replacement color. When the OK button 1011 is pressed via the input unit 133, the setting unit 134 sets the processing method selected by the radio button of the selection field 1001 for the font color determination, and sets the processing method selected by the radio button of the selection field 1002 for the character pixel replacement color determination. The setting unit 134 stores, in the storage area 120, the information on the processing method set for the font color determination and the character pixel replacement color determination. The font color determination unit 110 determines the font color based on the processing method setting of the font color determination stored in the storage area 120. The character pixel replacement color determination unit 111 determines the character pixel replacement color based on the processing method setting of the character pixel replacement color determination stored in the storage area 120.

The cancel button 1012 is a button for canceling the settings selected by the radio button of the selection field 1001 for font color and the radio button of the selection field 1002 for character pixel replacement color.

In the above description, the user manually sets the processing method for the font color determination and the character replacement color determination on the processing method selection screen 1000, but the manner of selection is not limited thereto. The processing method may be automatically set according to a predetermined condition.

As described above, in the MFP 10 according to the present embodiment, the processing method based on the original character color of the original image and that based on the original background color of the original image are selectable in the font color determination and the character pixel replacement color determination. The processing method for the character pixel color (replacement character pixel color) and that for the font color can be suitably combined to provide natural attention calling for the erroneous recognition in the character recognition which is easy to see for the reader.

Further, the MFP 10 according to the present embodiment allows the operator to set the processing method based on, for example, any one of the positive correlation with respect to the certainty factor, the negative correlation with respect to the certainty factor, the complementary color of the original character color, and the complementary color of the original background color in the font color determination and the character pixel replacement color determination. As a result, the variation of the visual attention calling is increased, and the document data can be output in an easy-to-see, convenient, and natural manner to a reader.

According to an aspect of the present disclosure, the combination between the color (density) of character pixels and the color of the font is considered to improve the viewability. With the combination of the character pixel color processing and the font color processing, data that is easy to see for a reader can be provided, and a natural attention calling for erroneous character recognition can be provided.

Modification

A description is given below of an MFP according to a modification, focusing on operations different from those of the MFP 10 according to the above-described embodiment. In this modification, a description is given of switching between the correlation-based method based on the positive correlation or the negative correlation with respect to the certainty factor and the complementary-color based method based on the complementary color, with a specific certainty factor as a switching point. Note that the hardware configuration and the functional configuration of the information processing system of the MFP 10 according to the present modification are similar to those of the above-described embodiment.

Figure 35:
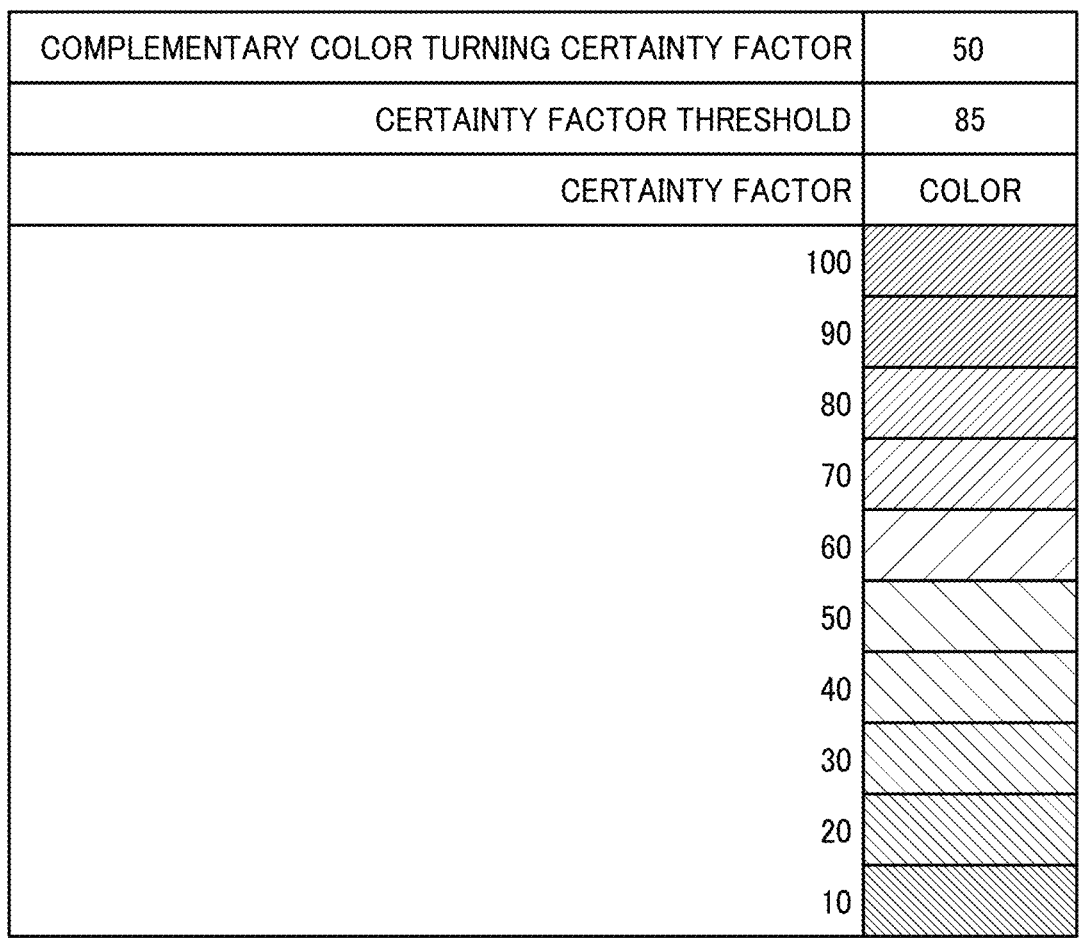
FIG. 35 is a diagram illustrating an example of a combination of the processing method based on positive correlation with the certainty factor and the processing method based on a complementary color according to a modification.
Figure 36:
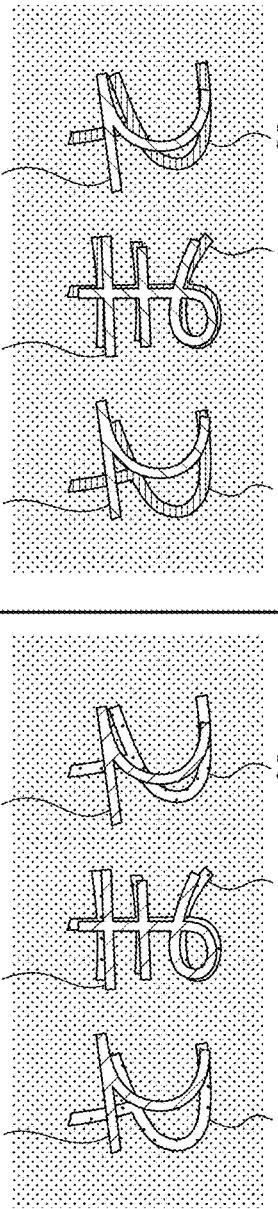
FIG. 36 is a diagram illustrating an example of a result of a combination of processing methods illustrated in FIG. 35, for determining character pixel replacement color and a font color.

FIG. 35 is a diagram illustrating an example of the combination of the processing method based on the positive correlation and that based on the complementary color. FIG. 36 is a diagram illustrating an example of the result of a combination of the character pixel replacement color processing and the font color processing. With reference to FIGS. 35 and 36, a description is given of the font color determination and the character pixel replacement color determination performed by the MFP 10 according to the present modification.

In the above-described embodiment, the processing method based on one of the positive correlation with respect to the certainty factor, the negative correlation with respect to the certainty factor, the complementary color of the original character color, and the complementary color of the original background color is set in performing the font color determination and the character pixel replacement color determination. By contrast, in the present modification, in at least one of the font color determination and the character pixel replacement color determination, the processing method is switched between the processing method based on the positive correlation or the negative correlation with respect to the certainty factor and the processing method based on the complementary color, with a specific certainty factor as the switching point. For example, in the font color determination (or character pixel replacement color determination), using a particular certainty factor as the turning point, the processing is performed based on the positive correlation or the negative correlation in the unit of one character or one noun for the certainty factor is equal to or higher than the turning point, and processing is performed based on the complementary color of the original character color or the original background color in the unit of one character or one noun for a certainty factor lower than the turning point. This configuration makes it easier to recognize the difference between the original image and the result of the OCR. The processing based on the positive correlation or the negative correlation and the processing based on the complementary color of the original character color or the original background color may be reversed with respect to the turning point.

The example illustrated in FIG. 35 is on the assumption that the turning point of the certainty factor is "50," the threshold value Th of the certainty factor is "80," and the original character color or the original background color is, for example, red. In this example, when the certainty factor is equal to or higher than the turning point, the processing is performed based on the positive correlation such that the color is made darker as the certainty factor increases and made lighter as the certainty factor decreases. When the certainty factor is lower than the turning point, the processing is performed based on the complementary color of the original character color or the original background color such that the color is made lighter as the certainty factor increases and made darker as the certainty factor decreases. FIG. 36 illustrates an example in which the font color determination and the character pixel replacement color determination are performed on the original image illustrated in FIG. 12 using the processing method combination illustrated in FIG. 35.

In the example on the left side in FIG. 36, since the certainty factor "40" is lower than the turning point "50," the font color is determined based on the complementary color of the original character color, and the character pixel replacement color is determined based on the positive correlation. In the example on the right side in FIG. 36, since the certainty factor "40" is lower than the turning point "50," the character pixel replacement color is determined based on the complementary color of the original background color, and the font color is determined based on the positive correlation.

This can increase variety of the combination of the processing method for the character pixel color (replacement character pixel color) and that for the font color can be suitably combined to provide natural attention calling for the erroneous recognition in the character recognition which is easy to see for the reader.

Note that the turning point of the processing method may be changed using the original background color as a threshold. If the character pixel replacement color becomes lighter than the original background color at a specific certainty factor, the character pixel replacement color at a certainty factor adjacent to the specific certainty factor may be maintained. By contrast, if the character pixel replacement color becomes darker than the original background color at a specific certainty factor, the character pixel replacement color at a certainty factor adjacent to the specific certainty factor may be maintained. This configuration can prevent color fogging between the original background color, the font color, and the character replacement color and can improve the visibility of the image.

In the present modification example, switching between the processing method based on the correlation with the certainty factor and the processing based on the complementary color at the turning point may be freely set on the above-described processing method selection screen 1000. In this case, also the turning point may be set.

In the above-described embodiment and modification, the language processing unit 108 extracts nouns through morphological analysis, but the target to be extracted is not limited thereto. The language processing unit 108 may extract a wide range of parts of speech such as adjectives, verbs, adverbs, particles, and conjunctions.

Each of the functions of the above-described embodiment and the modification may be implemented by one or more processing circuits or circuitry. Here, the "processing circuit or circuitry" in the present disclosure includes a programmed processor to execute each function by software, such as a processor implemented by an electronic circuit, and devices, such as an application specific integrated circuit (ASIC), a digital signal processor (DSP), a field programmable gate array (FPGA), a system on a chip (SOC), a graphics processing unit (GPU), and conventional circuit modules arranged to perform the recited functions.

Note that, in a case where at least a portion of the functional units of the MFP 10 according to the above-described embodiment is implemented by execution of a computer program, the program can be prestored in a ROM or the like. Alternatively, the computer program executed in the MFP 10 according the above-described embodiment or the modification can be provided as a file being in an installable format or an executable format and stored in a computer-readable recording medium, such as a compact disc read only memory (CD-ROM), a flexible disk (FD), a compact disc recordable (CD-R), a digital versatile disk (DVD), and a Secure Digital (SD) card. Further, the program executed by the MFP 10 according to the above-described embodiment or the modification may be stored on a computer connected to a network such as the Internet, to be downloaded via the network. Further, the computer program executed in the MFP 10 according the above-described embodiment or the modification may be provided or distributed via a network such as the Internet. A program to be executed by the MFP 10 according to the above-described embodiment or the modification has module structure including at least one of the above-described functional units. Regarding the actual hardware related to the program, the CPU reads and executes the program from the memory to load the program onto the main memory to implement the above-described functional units.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. An information processing apparatus comprising circuitry configured to:
   recognize a character in an original image by character recognition to generate a font;
   calculate a certainty factor of the character recognition;
   determine a color of the font based on the certainty factor by a first processing method;
   determine a replacement color by a second processing method based on the certainty factor, the replacement color being a color with which a color of a character pixel is replaced, the character pixel being a pixel of the recognized character; and
   convert the original image into an editable electronic document, the editable electronic document including the font and an image in which the character pixel has the replacement color,
   wherein the circuitry is configured to
     receive an input operation, and
     set the first processing method and the second processing method in accordance with the input operation.

2. The information processing apparatus according to claim 1, wherein the first processing method is one of:
   a method based on a positive correlation between visibility of the font and the certainty factor for increasing visibility of the font as the certainty factor increases and decreasing the visibility of the font as the certainty factor decreases; or
   a method based on a negative correlation between the visibility of the font and the certainty factor for increasing the visibility of the font as the certainty factor decreases and decreasing the visibility of the font as the certainty factor increases.

3. The information processing apparatus according to claim 1, wherein the circuitry is configured to set the second processing method to one of:
   a method based on a positive correlation between a degree of deletion of the character pixel and the certainty factor for increasing the degree of deletion of the character pixel as the certainty factor increases and decreasing the degree of deletion of the character pixel as the certainty factor decreases; or
   a method based on a negative correlation between the degree of deletion and the certainty factor for increasing the degree of deletion of the character pixel as the certainty factor decreases and decreasing the degree of deletion of the character pixel as the certainty factor increases.

4. The information processing apparatus according to claim 1, wherein the circuitry is configured to set the first processing method to one of:
   a method based on a positive correlation between visibility of the font and the certainty factor for increasing visibility of the font as the certainty factor increases and decreasing the visibility of the font as the certainty factor decreases;
   a method based on a negative correlation between the visibility of the font and the certainty factor for increasing the visibility of the font as the certainty factor decreases and decreasing the visibility of the font as the certainty factor increases;
   a first complementary color method based on a complementary color of the color of the character pixel; or
   a second complementary color method based on a complementary color of a background color, the background color being represented by a pixel value of a pixel of the original image other than the character pixel.

5. The information processing apparatus according to claim 1, wherein the circuitry is configured to set the second processing method to one of:
   a method based on a positive correlation between a degree of deletion of the character pixel and the certainty factor for increasing a degree of deletion of the character pixel as the certainty factor increases and decreasing the degree of deletion of the character pixel as the certainty factor decreases;
   a method based on a negative correlation between the degree of deletion of the character pixel and the certainty factor for increasing the degree of deletion of the character pixel as the certainty factor decreases and decreasing the degree of deletion of the character pixel as the certainty factor increases;
   a first complementary color method based on a complementary color of the color of the character pixel; or
   a second complementary color method based on a complementary color of a background color represented by a pixel value of a pixel of the original image other than the character pixel.

6. The information processing apparatus according to claim 1, wherein the circuitry is configured to switch the first processing method between a first correlation-based method and a complementary-color based method based on the certainty factor and a turning point, the first correlation-based method being based on a correlation between visibility of the font and the certainty factor and the complementary-color based method being based on a complementary color of the color of the character pixel or a complementary color of a background color represented by a pixel value of a pixel of the original image other than the character pixel.

7. The information processing apparatus according to claim 6, wherein the circuitry is configured to switch the second processing method between a second correlation-based method and a second complementary-color based method based on the certainty factor and the turning point, the second correlation-based method being based on a correlation between degree of deletion of the character pixel with the certainty factor, and the second complementary-color based method being based on the complementary color of the character pixel or the complementary color of the background color.

8. The information processing apparatus according to claim 1, wherein the circuitry is configured to switch the second processing method at between a correlation-based method and a complementary-color based method, the correlation-based method being based on a correlation between degree of deletion of the character pixel with the certainty factor; and the complementary-color based method being based on a complementary color of the character pixel or a complementary color of a background color represented by a pixel value of a pixel of the original image other than the character pixel.

9. The information processing apparatus according to claim 1, wherein the first processing method and the second processing method are independent from each other.

10. The information processing apparatus according to claim 1, wherein the circuitry is configured to superimpose on the original image the character pixel having the replacement color determined by the second processing method and the font having the color determined by the first processing method to generate the editable electronic document.

11. A method for converting an image, the method comprising:
   recognizing a character in an original image by character recognition to generate a font;
   calculating a certainty factor of the character recognition;
   determining a color of the font based on the certainty factor by a first processing method;
   determining a replacement color by a second processing method based on the certainty factor, the replacement color being a color with which a color of a character pixel is replaced, the character pixel being a pixel of the recognized character; and
   converting the original image into an editable electronic document, the editable electronic document including the font and an image in which the character pixel has the replacement color,
   wherein the method further comprises
      receiving an input operation, and
      setting the first processing method and the second processing method in accordance with the input operation.

12. The method according to claim 11, wherein the first processing method is one of:
   a method based on a positive correlation between visibility of the font and the certainty factor for increasing visibility of the font as the certainty factor increases and decreasing the visibility of the font as the certainty factor decreases; or
   a method based on a negative correlation between the visibility of the font and the certainty factor for increasing the visibility of the font as the certainty factor decreases and decreasing the visibility of the font as the certainty factor increases.

13. The method according to claim 11, wherein the setting includes setting the second processing method to one of:
   a method based on a positive correlation between a degree of deletion of the character pixel and the certainty factor for increasing the degree of deletion of the character pixel as the certainty factor increases and decreasing the degree of deletion of the character pixel as the certainty factor decreases; or
   a method based on a negative correlation between the degree of deletion and the certainty factor for increasing the degree of deletion of the character pixel as the certainty factor decreases and decreasing the degree of deletion of the character pixel as the certainty factor increases.

14. The method according to claim 11, wherein the setting includes setting the first processing method to one of:
- a method based on a positive correlation between visibility of the font and the certainty factor for increasing visibility of the font as the certainty factor increases and decreasing the visibility of the font as the certainty factor decreases;
- a method based on a negative correlation between the visibility of the font and the certainty factor for increasing the visibility of the font as the certainty factor decreases and decreasing the visibility of the font as the certainty factor increases;
- a first complementary color method based on a complementary color of the color of the character pixel; or
- a second complementary color method based on a complementary color of a background color, the background color being based on a pixel value of a pixel of the original image other than the character pixel.

15. The method according to claim 11, wherein the setting includes setting the second processing method to one of:
- a method based on a positive correlation between a degree of deletion of the character pixel and the certainty factor for increasing a degree of deletion of the character pixel as the certainty factor increases and decreasing the degree of deletion of the character pixel as the certainty factor decreases;
- a method based on a negative correlation between the degree of deletion of the character pixel and the certainty factor for increasing the degree of deletion of the character pixel as the certainty factor decreases and decreasing the degree of deletion of the character pixel as the certainty factor increases;
- a first complementary color method based on a complementary color of the color of the character pixel; or
- a second complementary color method based on a complementary color of a background color represented by a pixel value of a pixel of the original image other than the character pixel.

16. The method according to claim 11, further comprising:
- switching the first processing method between a first correlation-based method and a complementary-color based method based on the certainty factor and a turning point the first correlation-based method being based on a correlation between visibility of the font and the certainty factor; and the complementary-color based method being based on a complementary color of the color of the character pixel or a complementary color of a background color represented by a pixel value of a pixel of the original image other than the character pixel.

17. The method according to claim 16, further comprising:
- switching the second processing method between+a second correlation-based method and a second complementary-color based method based on the certainty factor and the turning point, the second correlation-based method being based on a correlation between degree of deletion of the character pixel with the certainty factor and the second complementary-color based method being based on the complementary color of the character pixel or a-the complementary color of the background color.

18. The method according to claim 11, wherein the first processing method and the second processing method are independent from each other.

19. A non-transitory recording medium storing a plurality of program codes which, when executed by one or more processors, causes the one or more processors to perform a method, the method comprising:
- recognizing a character in an original image by character recognition to generate a font;
- calculating a certainty factor of the character recognition;
- determining a color of the font based on the certainty factor by a first processing method;
- determining a replacement color by a second processing method based on the certainty factor, the replacement color being a color with which a color of a character pixel is replaced, the character pixel being a pixel of the recognized character; and
- converting the original image into an editable electronic document, the editable electronic document including the font and an image in which the character pixel has the replacement color, wherein the method further comprises
- receiving an input operation, and
- setting the first processing method and the second processing method in accordance with the input operation.

20. The non-transitory recording medium according to claim 19, wherein the first processing method is one of:
- a method based on a positive correlation between visibility of the font and the certainty factor for increasing visibility of the font as the certainty factor increases and decreasing the visibility of the font as the certainty factor decreases; or
- a method based on a negative correlation between the visibility of the font and the certainty factor for increasing the visibility of the font as the certainty factor decreases and decreasing the visibility of the font as the certainty factor increases.

* * * * *